United States Patent [19]
Savoie

[11] Patent Number: 6,012,965
[45] Date of Patent: Jan. 11, 2000

[54] MANUFACTURING OPHTHALMIC LENSES USING LENS STRUCTURE COGNITION AND SPATIAL POSITIONING SYSTEM

[75] Inventor: Marc Y. Savoie, Moncton, Canada

[73] Assignee: Micro Optics Design Corp., Irvine, Calif.

[21] Appl. No.: 09/252,685

[22] Filed: Feb. 22, 1999

Related U.S. Application Data

[63] Continuation of application No. 08/944,534, Oct. 7, 1997, Pat. No. 5,919,080.

[51] Int. Cl.$^7$ ..................................................... B24B 49/00
[52] U.S. Cl. .................................... 451/6; 451/5; 451/42; 451/384
[58] Field of Search .................................. 451/42, 41, 5, 451/6, 8, 460, 390, 384

[56] References Cited

U.S. PATENT DOCUMENTS

| | | |
|---|---|---|
| 3,663,983 | 5/1972 | Bole . |
| 3,804,153 | 4/1974 | Tagnon . |
| 3,828,842 | 8/1974 | Tagnon .................................... 164/334 |
| 4,288,946 | 9/1981 | Bicskei . |
| 4,319,846 | 3/1982 | Henry et al. . |
| 4,330,203 | 5/1982 | Oppenheim . |
| 4,479,332 | 10/1984 | Stern et al. ................................ 51/277 |
| 4,677,729 | 7/1987 | Morland . |
| 4,737,918 | 4/1988 | Langlois . |
| 5,283,980 | 2/1994 | Lohrenz . |
| 5,425,665 | 6/1995 | Kennedy . |
| 5,498,200 | 3/1996 | Werner . |
| 5,505,654 | 4/1996 | Wood . |
| 5,648,025 | 7/1997 | Cook et al. ............................. 264/1.36 |
| 5,720,647 | 2/1998 | Gottschald .................................. 451/5 |
| 5,721,644 | 2/1998 | Murray et al. ........................... 359/819 |

*Primary Examiner*—Timothy V. Eley
*Assistant Examiner*—Dung Van Nguyen
*Attorney, Agent, or Firm*—Mario D. Theriault

[57] ABSTRACT

A method for generating a virtual entity of an ophthalmic lens blank in a computer environment and for using this entity to monitor and control a lens generation process. The method comprises the steps of analyzing an image of a lens blank, measuring a first surface of a lens blank, probing a second surface, and locating both surfaces and the contour of the lens blank in a spatial coordinate system. These data are used to generate a virtual entity that is a precise representation of the lens blank. The virtual entity is used throughout the lens generation process for blocking the lens, for calculating and selecting lens orientation, skewing, prism, tool angles and ideal tool paths that produce best lens quality.

20 Claims, 18 Drawing Sheets

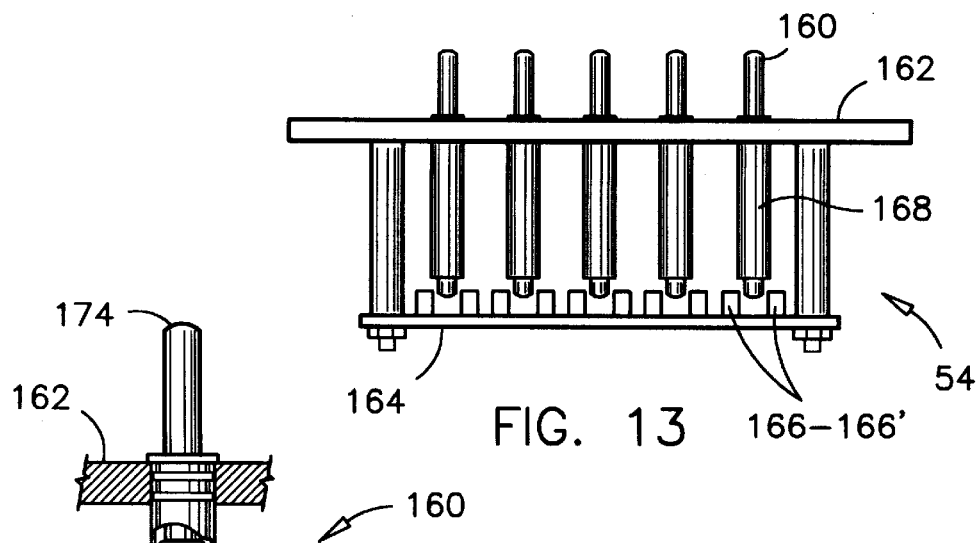
FIG. 13
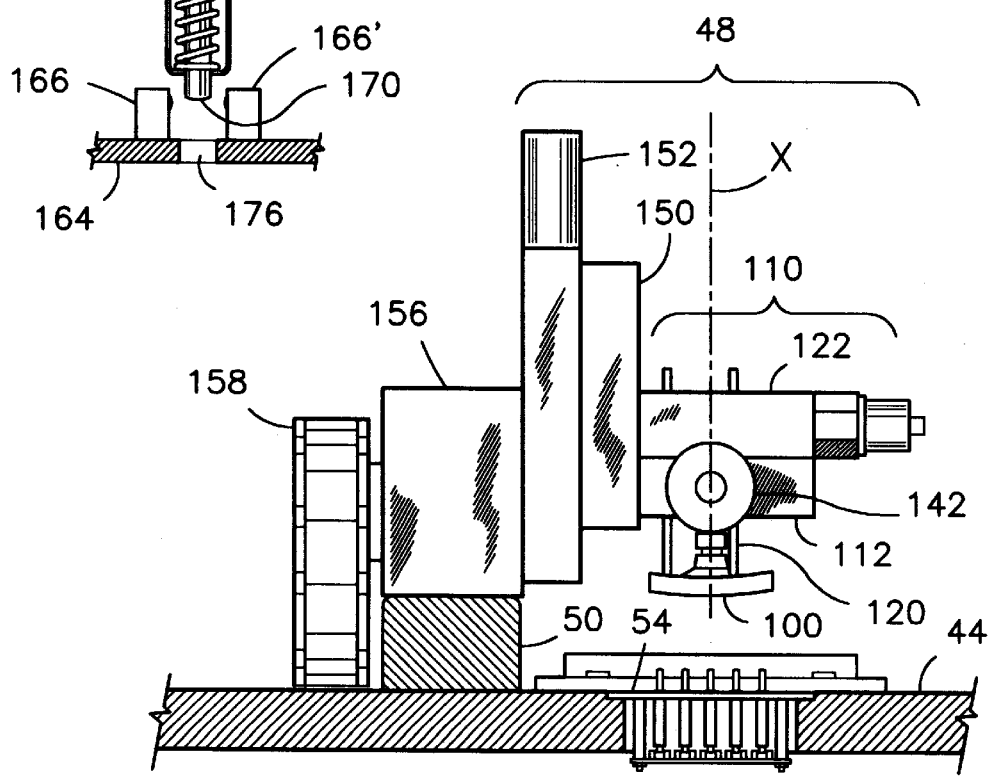
FIG. 14
FIG. 12

MANUFACTURING OPHTHALMIC LENSES USING LENS STRUCTURE COGNITION AND SPATIAL POSITIONING SYSTEM

This is a continuation of U.S. patent application Ser. No. 08/944,534, now U.S. Pat. No. 5,919,080, filed on Oct. 07, 1997.

FIELD OF THE INVENTION

The present invention relates to a method for manufacturing an optical lens, and more particularly, it relates to a method for manufacturing an ophthalmic lens while monitoring the positions of an accurate computer-generated virtual entity of that lens in a spatial coordinate system.

BACKGROUND OF THE INVENTION

An ophthalmic lens in its simplest form has two distinct surfaces, each on a respective side of the lens. These two surfaces cooperate with each other to either converge or diverge light and thereby correct vision problems. When a position or shape of one of these surfaces relative to the other is imprecise, optical errors are created. This is the type of optical errors basically that is of interest herein, and that is primarily addressed by the method of the present invention.

A blocking of an ophthalmic lens blank is required prior to working the lens blank in a lens generating apparatus. Modern ophthalmic lens generating apparatus especially are computer-controlled machines capable of generating a final optical surface on an ophthalmic lens in a single operation. These apparatus may also include profiling equipment capable of shaping the edge contour of the lens while the lens blank remains bonded to the original support block used during the surface generation process.

As can be appreciated, the precision of these machines depends greatly upon the accuracy with which the lens blank is affixed to the support block. Conventional lens blocking typically follows one of two approaches, the first and most common method is referred to as geometric centre blocking, and the second method is called optical centre blocking. In the first case, a support block is attached to the geometric centre of the lens blank, (Blank Geometric Center). In the second method, the block is attached to a point on the front surface of the lens through which the optical axis of the lens passes, or at a point where the prescribed prism is to be found, (Major Reference Point). The support block which is made of metal or plastic is bonded to the front surface of the lens in order to serve as a work-holder having known positional reference points and datum plane relative to the lens' front surface. All surfacing and shaping work is then done relative to these positional references.

The machines of the prior art for blocking a lens have evolved from a basic manual and visual alignment of markings on the lens blank with references on the support block, to semi-automatic equipment using a pick and place manipulator and LCD generated target images for positioning the lens blank. In this respect, a representative group of lens blockers of the prior art is presented hereinbelow.

In a first example of lens blockers of the prior art, the U.S. Pat. No. 3,663,983 issued on May 23, 1972 to Hamilton B. Bole describes an apparatus for forming a block on a lens. The apparatus has a block molding station relative to which a plurality of blocking molds are selectively successively indexed for receiving both a lens blank to be blocked and material for forming the block. The apparatus includes lens aligning indicia which become automatically illuminated with the positioning of each mold at the blocking station. The apparatus further includes spring clamping means with which lens blanks to be blocked are clamped to respective blocking molds and securely retained in desired aligned relationship with the molds during the formation of the blocks.

In a second example of lens blockers of the prior art, the U.S. Pat. No. 3,804,153 issued on Apr. 16, 1974 to Luc Andre Tagnon illustrates a device for positioning a mold for casting a metal block onto the surface of a lens. The mold is movable by means of a spherical swivel joint and pantograph linkage such that the reference axes of the mold are movable to coincide with the optical axes of the lens blank, and such that the mold always makes direct contact with the curved surface of the lens. The reference axes on the metal block are later used for controlling the movements of a lens trimming and bevelling machine.

Another example of lens blocking devices of the prior art is described in the U.S. Pat. No. 4,288,946 issued on Sep. 15, 981 to Bela J. Bicskei. The device comprises a tripod on which an ophthalmic lens is placed, and a projector and mirror assembly for projecting target image from under the tripod. The lens is manually positioned on the tripod with the optical markings on the lens corresponding to the target image of the projection. When the lens is properly positioned, an articulated blocking arm is used for precisely positioning and securing a support block to the lens blank.

In yet another example, the U.S. Pat. No. 4,319,846 issued on Mar. 16, 1982 to David W. Henry et al. describes a method and apparatus for aligning a lens blank upon a lens blocking station. A transparent indicia is movable back and forth over a lens supported on a blocking station. The indicia is firstly used to properly position the lens blank over the blocking station, with the optical axes of the lens blank being in a consistent orientation relative to the blocking station.

Another example of lens blocking devices of the prior art is described in U.S. Pat. No. 5,283,980 issued on Feb. 8, 1994 to Marold H. Lohrenz et al. With this device, a lens blank is placed over a sheet of non-slip transparent material covering a liquid crystal display connected to a computer. The LCD exhibits a target image generated by the computer. The lens is manually positioned over the sheet of non-slip material according to the markings of the target image. The computer calculates and compensates for the optical error in the refractive characteristics of the non-slip sheet and the viewing glass, and shifts the target image to account for the error. Once the lens is properly positioned, a lens support block is affixed to the lens blank using a blocking arm capable of applying a constant force to the lens independently of the height of the lens blank.

The U.S. Pat. No. 5,498,200 issued on Mar. 12, 1996 to Ralf Werner describes a device for attaching a holder to a lens blank before grinding the edge of a lens blank. The lens blank is placeable over a glass plate carrying a tripod stand. A LCD screen is used to project a scale, a template image or an eyeglass frame image. A prism is positioned between the lens blank and the eye of an operator of the device for superimposing the projection of the LCD screen onto the image of the lens blank. The tripod is raiseable to a predetermined height before the lens blank is adjusted on the tripod and a support block is affixed thereto.

A further example of a lens blocker of the prior art is described in U.S. Pat. No. 5,505,654 issued on Apr. 9, 1996 to Kenneth O. Wood et al. The apparatus comprises an alignment station for supporting and aligning the lens blank with a target image generated by a liquid crystal display. Both the image of the lens and the target image are projected on a viewing mirror in front of the operator of the apparatus. The apparatus also has a movable pick and place arm with a vacuum picking cup for moving the lens from the alignment station to a blocking station while maintaining the lens orientation. The blocking station includes a support for a lens block, a support for the lens blank and a system for injecting heated liquid bonding material between the lens and the block which solidifies on cooling to join the lens and block together.

Other lens blocking apparatus of the prior art are describe in the following U.S. Patents. All these machines are also characterized by the fact that the blocking process includes the placement of a lens blank on a support ring or on the support block itself during the bonding of the block to the lens.

U.S. Pat. No. 4,330,203 issued on May 18, 1982 to Oppenheim et al.;

U.S. Pat. No. 4,677,729 issued on Jul. 7, 1987 to A. H. Morland et al.;

U.S. Pat. No. 4,737,918 issued on Apr. 12, 1988 to J. P. Langlois et al.;

U.S. Pat. No. 5,425,665 issued on Jun. 20, 1995 to B. H. Kennedy;

Given that a large percentage of the lenses have aspherical front surfaces, segmented bifocals or spherical-aspherical front halves, the placing of a lens on a circular support ring or on a circular block is prone to positioning errors. In these cases, the contact surface between the lens and the support ring or block is only a partial circle or few contact points wherein the lens may tilt during the clamping motion and the axes thereof may be out of referential position relative to the block's datum plane.

The efficiency of computerized numerically controlled (CNC) lens generating apparatus depends greatly upon the precision of the lens blocking process and the available information about the lens blank, for programming the controller of the CNC machine. For example, when the locations and curvatures of both surfaces of a lens blank are known precisely, it is possible for the controller of the machine to calculate the amount of material to be removed during the surface generating process, the exact coordinates for an initial cut, the total number of cuts required, the depth of cut for a finishing pass and the total duration of the surface generating process. These values may thereafter be analysed and integrated for programming a lens generating apparatus and generating lenses of a highest quality, at an optimum rate of processing.

Generally, it has been difficult with the lens blockers of the prior art, to obtain consistent blocking and accurate information about the front and back surfaces and thickness of a lens blank for supporting a significant optimization of the efficiency of a lens generating apparatus. In the past, emphasis has been placed on the precision in the positioning of the optical references of a lens blank relative to the support block. The physical locations and curvatures of both surfaces have been of a secondary interest.

For this reason, and despite the use of ultra-precision computer-controlled apparatus, ophthalmic lens generated nowadays are not always errorless. Ophthalmic lens are often thicker than they could be for providing a good appearance when mounted in a thin frame for example.

As explained before, the devices and apparatus of the prior art have attached little importance to the measurement of the exact positions of both surfaces of a lens blank. As a result, a first surface is often generated in a lens blank without knowing precisely where the second surface really is.

Furthermore, some devices and apparatus of the prior art use lens supports and vacuum picking cups made of resilient material such as rubber for example. Although the positioning of the lens is precisely effected at the imaging station, the manipulation of the lens using flexible members prior to bonding the lens can cause slight misalignment of the lens during the bonding of the lens to the support block thus causing a prism error or other defects in the generated lens.

SUMMARY OF THE INVENTION

In the method of the present invention, the blocking of a lens blank is selectively done on the geometric centre of the lens blank, on the optical center, or on any other location on the lens surface that is more appropriate to meet the geometric or optical constrictions of a lens blank. The computer system used for carrying out the method of the present invention chooses the best lens placement relative to the support block. It displays this best placement on an imaging screen, and prompts an operator to place a lens blank on a lens receiving tripod according to a preferred orientation. The computer system does the required surfacing and motion control calculations to position the geometric center or the major reference point of the lens blank where it should be.

Moreover, the method of the present invention uses machine vision and probing equipment to generate an accurate virtual entity of the lens blank. This virtual entity is used throughout the lens generation process for calculating and selecting lens angles, tool angles and tool paths that produce best lens quality. It is also used as a standard for monitoring and controlling the precision of a lens generation process.

In a broad aspect of the present invention, there is provided a method for generating a virtual entity of an ophthalmic lens blank. This broad method comprises the steps of:

defining a spatial coordinate system in a computer environment;

analyzing an image of a lens blank and locating this image in the spatial coordinate system;

measuring a back curvature of the lens blank and locating the back curvature in the spatial coordinate system;

probing a front curvature of the lens blank and locating the front curvature in the spatial coordinate system; and integrating the image, the back curvature and the front curvature and generating a virtual entity of the lens blank in the computer environment.

The virtual entity generated by this method is an accurate representation of the lens blank and is usable for monitoring a lens surfacing process when that process is adapted to be controlled in the computer environment.

In more specific terms, and according to another aspect of the present invention, there is provided a method for blocking an ophthalmic lens blank to a support block and for generating a virtual entity of that lens blank in a computer environment. This virtual entity is later used for defining and for monitoring a lens generating operation on a physical equivalent thereof. The new method comprises the steps of:

defining a spatial coordinate system in a computer environment;

analysing an image of a lens blank and locating a contour of the lens blank and manufacturer's markings on that lens blank in the spatial coordinate system;

measuring a back curvature of the lens blank and locating a position of the back curvature in the spatial coordinate system;

probing a front curvature of the lens blank and locating a position of the front curvature in the spatial coordinate system;

generating a virtual entity of the lens blank in the computer environment and locating the virtual entity in the spatial coordinate system;

locating a support block and a molding ring around the support block within the spatial coordinate system; and while monitoring a position of the virtual entity relative to the spatial coordinate system, positioning the lens blank above the support block and the molding ring, at a distance from the support block and the molding ring, and injecting bonding material between the lens blank and the support block for bonding the lens blank to the support block.

This method for generating a virtual entity of a lens blank and for using the virtual entity for bonding the lens blank to a block is particularly advantageous for eliminating errors due to improper blocking of a lens blank. Because the lens blank does not come in contact with either the support block or the molding ring, irregularities in a curvature of the lens blank facing the support block are inconsequential to the precision with which the lens blank is bonded to the support block.

In another aspect of the present invention, there is provided a method for generating a surface on an ophthalmic lens using lens structure cognition, spatial positioning, a lens blocker and a lens gene rating apparatus. In this method, both the lens blocker and the lens generating apparatus operate in a computer environment. In this aspect of the present invention, the new method comprises the steps of:

defining first and second spatial coordinate systems in a computer environment;

analysing an image of a lens blank and locating a contour of the lens the blank and manufacturer's markings on that lens blank in the first spatial coordinate system;

measuring a back curvature of the lens blank and locating a position of the back curvature in the first spatial coordinate system;

probing a front curvature of the lens blank and locating a position of the front curvature in the first spatial coordinate system;

generating a virtual entity of the lens blank in the computer environment and locating this virtual entity in the first spatial coordinate system;

locating a support block and a molding ring around the support block within the first spatial coordinate system;

while monitoring the virtual entity in the first spatial coordinate system, blocking the lens blank on the support block at a distance from the support block and from the molding ring;

assigning reference features to the support block in the first spatial coordinate system, and assigning the virtual entity to these reference features;

locating a lens generating apparatus in the second spatial coordinate system;

installing the lens blank and support block assembly in the lens generating apparatus;

locating the reference features of the support block in the second spatial coordinate system;

locating the virtual entity in the second spatial coordinate system;

simulating first and subsequent tool paths on the virtual entity;

evaluating optical error in each of the first and subsequent tool paths;

defining one of the first and subsequent tool paths having minimum optical error;

assigning the one of the first and subsequent tool paths having minimum optical error as the ideal tool path;

programming the ideal tool path in the lens generating apparatus; and while monitoring a position of the virtual entity in the second spatial coordinate system, generating a surface on the lens blank using the programmed ideal tool path.

A primary advantage of this method is that the characteristics of the lens blank are known precisely and are associable to a virtual entity of that lens blank. It is therefore possible to manipulate this virtual entity in a computer environment. It is thereby possible to analyse a multiplicity of tool paths and to devise lens surfacing parameters that will produce high quality lenses before the lens surfacing operation begins. All these analyses are effected automatically without having to query an operator. The ideal tool paths are selected by the computer system, and a lens surfacing operation is carried out automatically according to deal conditions that would be practically impossible to determined by conventional methods. Furthermore, the lens generation operation is controlled using standards embodied in the virtual entity.

In a further aspect of the present invention, the step of generating a surface on an ophthalmic lens relates to surfaces having spherical power, cylindrical power and cylindrical axis. In this aspect of the invention, the step of simulating first and subsequent tool paths on the virtual entity comprises the step of rotating the virtual entity about itself between each simulated tool path. The information obtained therefrom is advantageously used for properly positioning the lens blank onto the support block, or for properly orienting the lens blank in the chuck of a lens generating apparatus. Whereas astigmatic lens with negative cylindrical power are traditionally generated with the cylindrical axis thereof oriented along a tool-sweep path of a lens generating apparatus, the method of the present invention provides for a lens surface generating process wherein the spherical or cylindrical meridian is oriented along, or at right angle with, the tool-sweep path.

In the method of the present invention, the virtual entity of the lens blank is a precise representation of the lens blank. It is used as a standard by which a lens generation process is controlled. The virtual entity is manipulated in a computer environment for devising ideal tool path that would be impossible to define otherwise. The step of generating a surface on a lens blank is carried out while precisely monitoring all the physical characteristics of that lens blank, in order to generate ophthalmic lenses of outstanding quality.

BRIEF DESCRIPTION OF THE DRAWINGS

The method of the preferred embodiment of the present invention will be further understood from the following description, with reference to the drawings in which like numeral denote like parts throughout the several views, and in which:

FIG. 12 is cross-section view of the probing station of the ophthalmic lens blocker as seen along line 12—12 in FIG. 3;

FIG. 13 is an elevation view of the array of gauge plungers of the probing station of the ophthalmic lens blocker;

FIG. 14 is an enlarged, partial cross-section view of a gauge plunger of the probing station;

DETAILED DESCRIPTION OF THE PREFERRED EMBODIMENT

Figure 1:
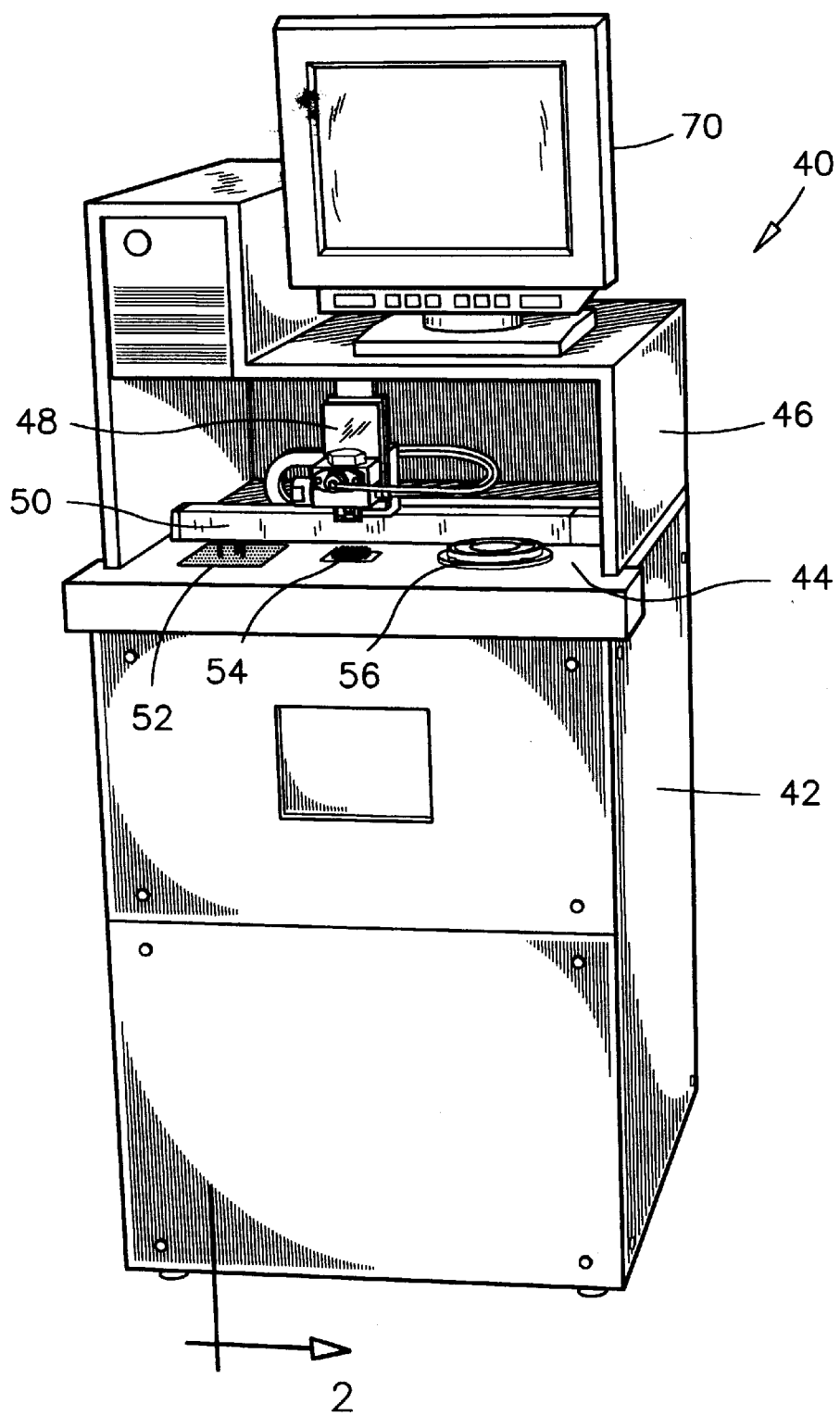
FIG. 1 is a front, top and right side perspective view of the ophthalmic lens blocker used in carrying out the method according to the preferred embodiment.
Figure 2:
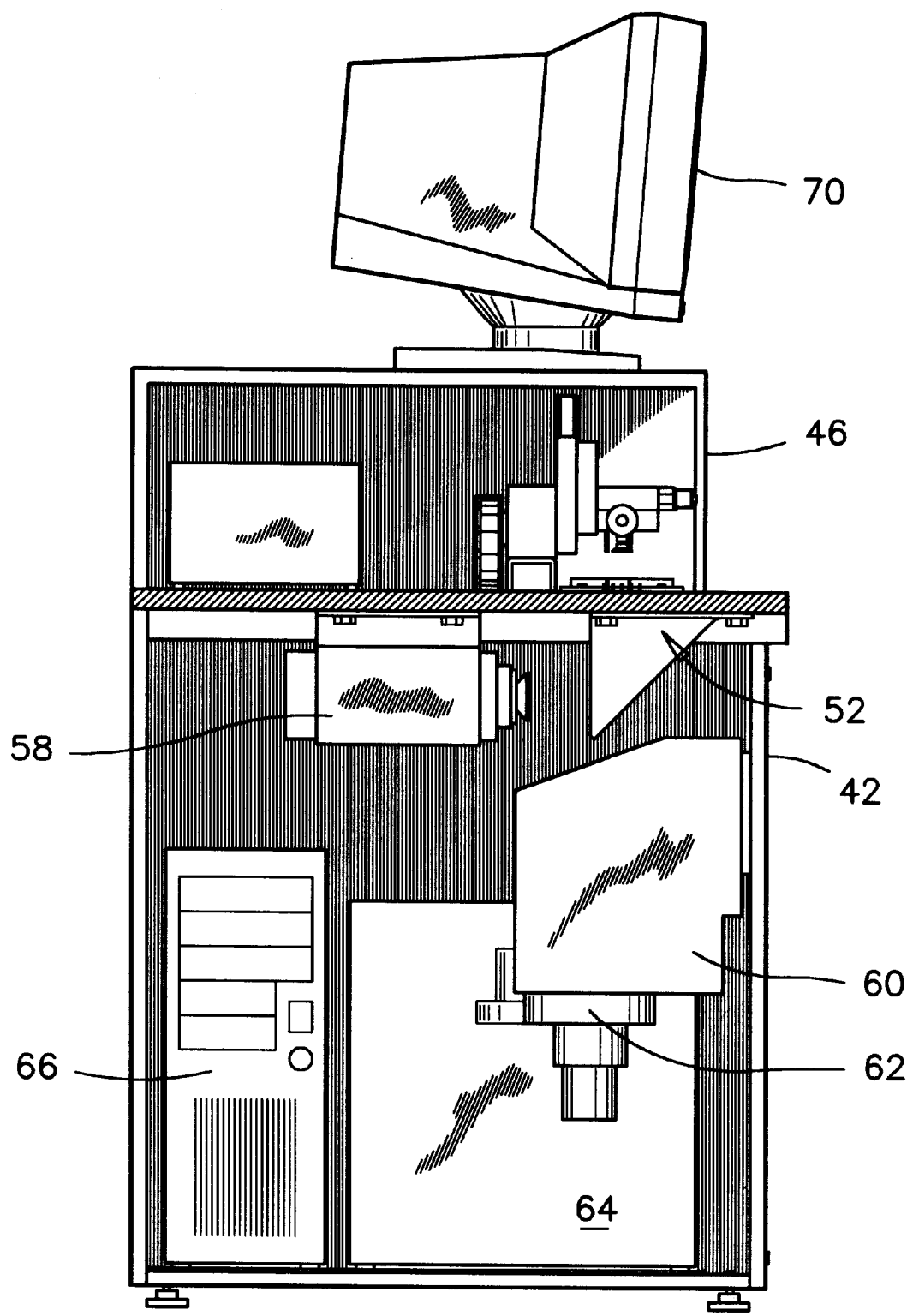
FIG. 2 is a cross-section view inside the cabinet of the ophthalmic lens blocker as seen along line 2 in FIG. 1.

In carrying out the method according to the preferred embodiment, at least a first and second apparatus are utilized for generating an ophthalmic lens. The first apparatus is used for scanning, probing, measuring and blocking an ophthalmic lens blank. The second machine is used for generating an optical surface on that lens blank. This second machine may also be used for contouring and chamfering the lens blank. In some cases, the lens surfacing process also comprises a washing, polishing and de-blocking machine, as well as lens coating equipment. However, these latter apparatus are not described herein for being known in the industry, and for not being essential for carrying out the method of the present invention.

Whether two or more apparatus are utilized in the manufacturing of ophthalmic lenses, each apparatus is controlled by respective computer referred to herein as a central processor unit (CPU). The CPU of each machine is in communication with and individually controlled by a main computer, hereinafter referred to as the lab computer, in which lens prescriptions are entered and databanks of lens blank specification are stored. Each CPU is capable of controlling routine operations of the machine to which it is dedicated, but receives its higher level instructions from the lab computer.

DESCRIPTION OF THE APPARATUS

With regard to the first apparatus, the method of the preferred embodiment comprises the first broad step of blocking a lens blank on a support block. This first step is effected on an ophthalmic lens blocker 40 such as illustrated in FIGS. 1–16.

The ophthalmic lens blocker 40 comprises a cabinet 42 having a top surface 44 and a hood structure 46 partly enclosing the top surface 44. A lens blank manipulator 48 is movably mounted on a first linear actuator 50 affixed to the top surface 44. The first linear actuator 50 has a first servo motor or stepper motor/encoder unit for moving the lens blank manipulator 48 there-along and for monitoring its position at all times.

The ophthalmic lens blocker 40 also has, aligned along the first linear actuator 50 and incorporated in the top surface 44 of the cabin 42, a lens imaging station 52, a lens probing station 54 and a lens/block molding station 56.

The cabinet 42 encloses a camera 58 which is focused on the imaging station 52, a wax reservoir 60 and a wax heating and pumping unit 62 for pumping molten wax to the lens/block molding station 56, a chiller 64 for cooling the lens/block molding station and a central processing unit (CPU) 66 for controlling the operation of the lens blocker.

The hood 46 has a compartment on the left side thereof enclosing a light source (not shown) for illuminating the imaging station 52. The hood 46 also has a support surface supporting a CRT screen 70. The CRT screen 70 is preferably a "touch-type" screen whereby the controlling of the operation of the lens blocker is effected by touching command buttons appearing directly on that screen 70.

Figure 3:
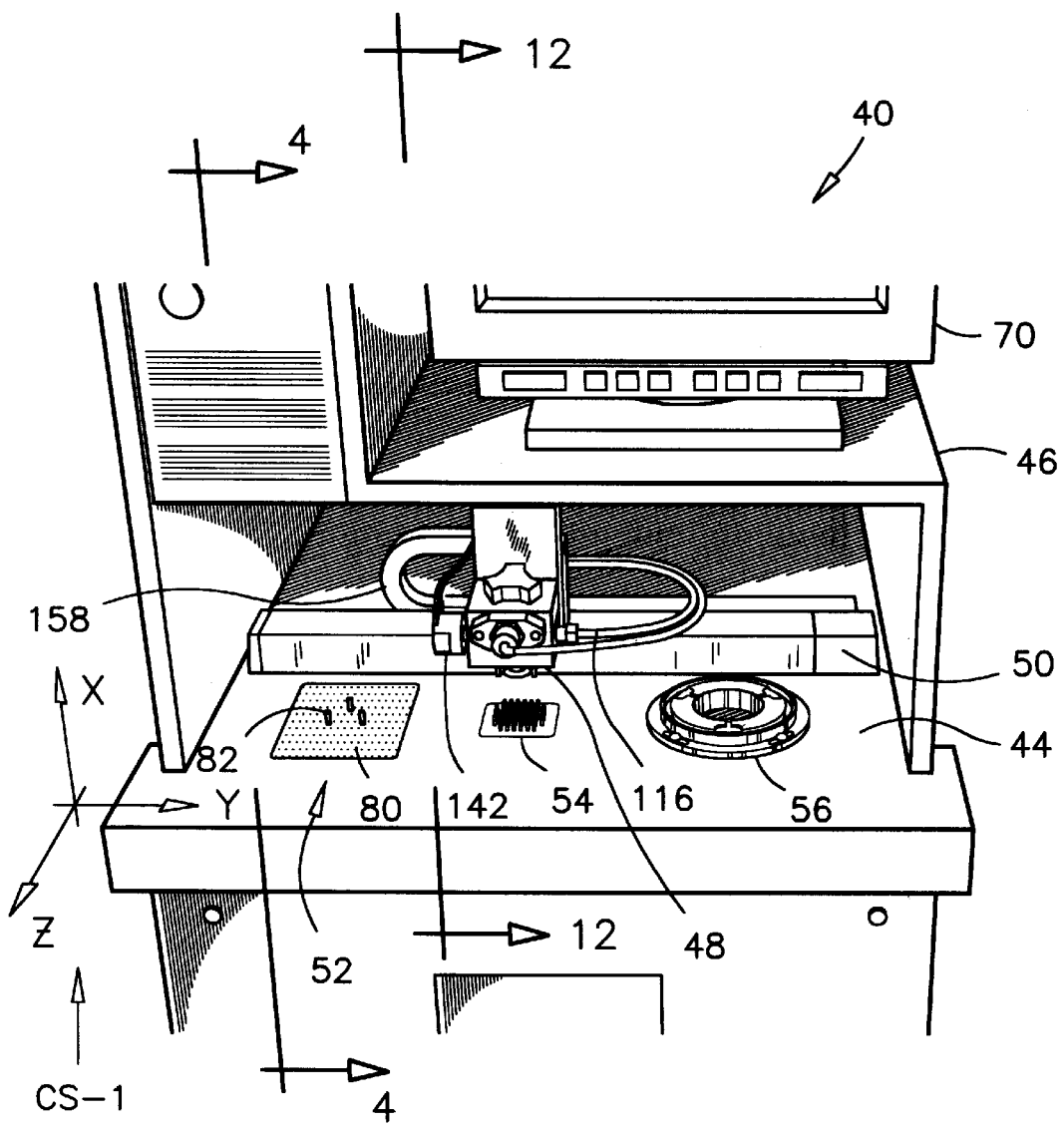
FIG. 3 is an enlarged perspective view of the tabletop surface of the ophthalmic lens blocker illustrated in FIG. 1.
Figure 4:
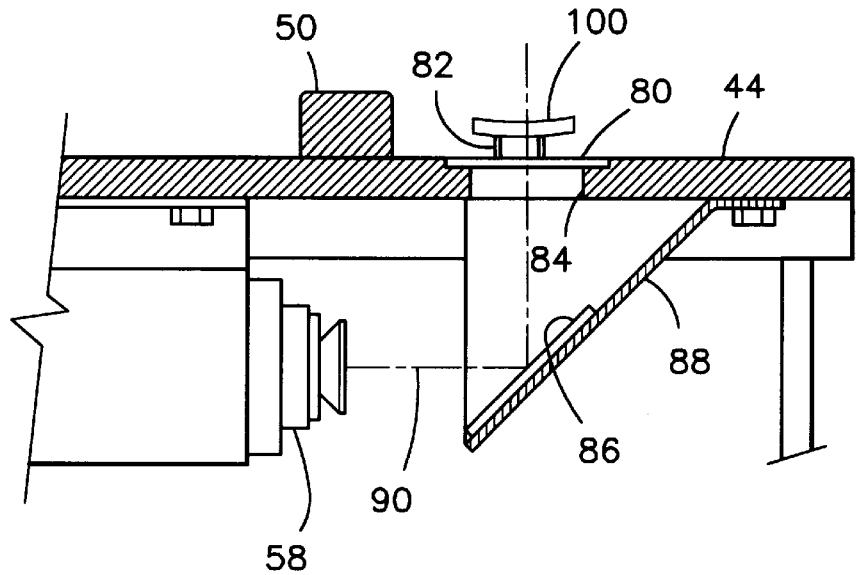
FIG. 4 is a cross-section view of the imaging station of the lens blocker as seen along line 4—4 in FIG. 3.

Referring now to FIGS. 3 and 4, the imaging station 52 of the lens blocker 40 comprises a ground glass plate 80 having three pegs 82 protruding from the upper surface thereof and defining a triangular formation. The ground glass plate 80 is mounted over an opening 84 in the top surface 44. The camera 58 is mounted under the top surface 4 and is oriented toward a mirror 86 and mirror support structure 88 which are oriented to reflect a line of sight 90 of the camera toward the ground glass plate 80. The mirror 86 is also used for inverting the image of the lens blank, to be displayed on the CRT screen 70.

Figure 5:
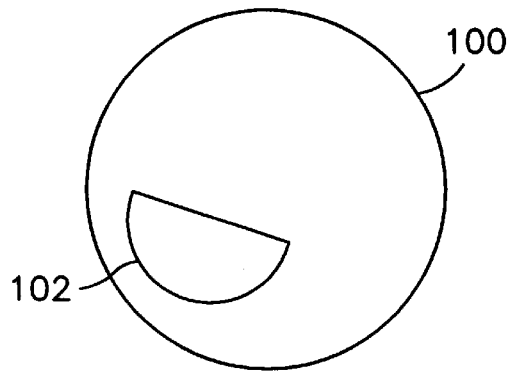
FIG. 5 is a typical outline of an actual lens blank.
Figures 6, 7:
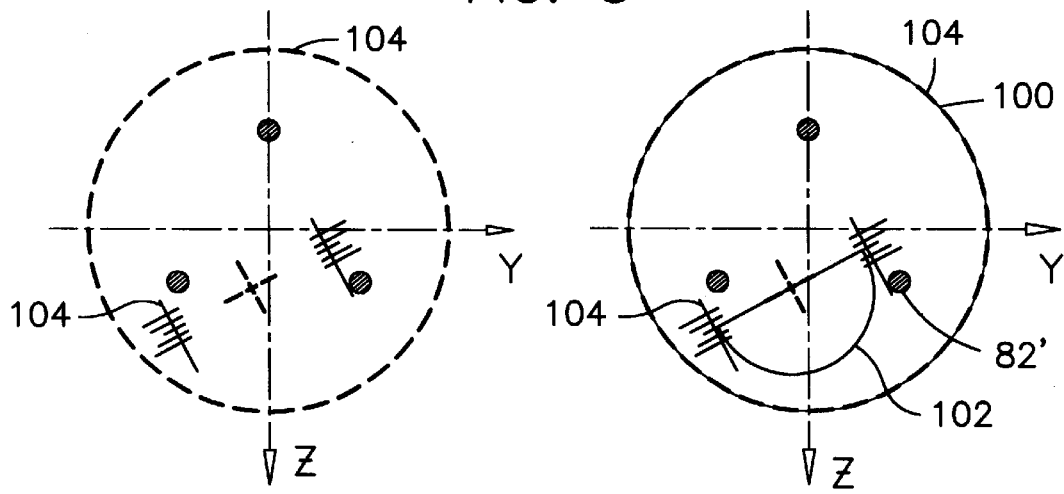
FIG. 6 is a projected image of a computer-generated template in which the manufacturer's markings are rotated for proper alignment of the lens blank.
FIG. 7 is a projected image of the lens blank superimposed over the computer-generated template, after the operator alignment of the lens blank on the tripod, as seen on the CRT screen of the lens blocker.
Figure 8:
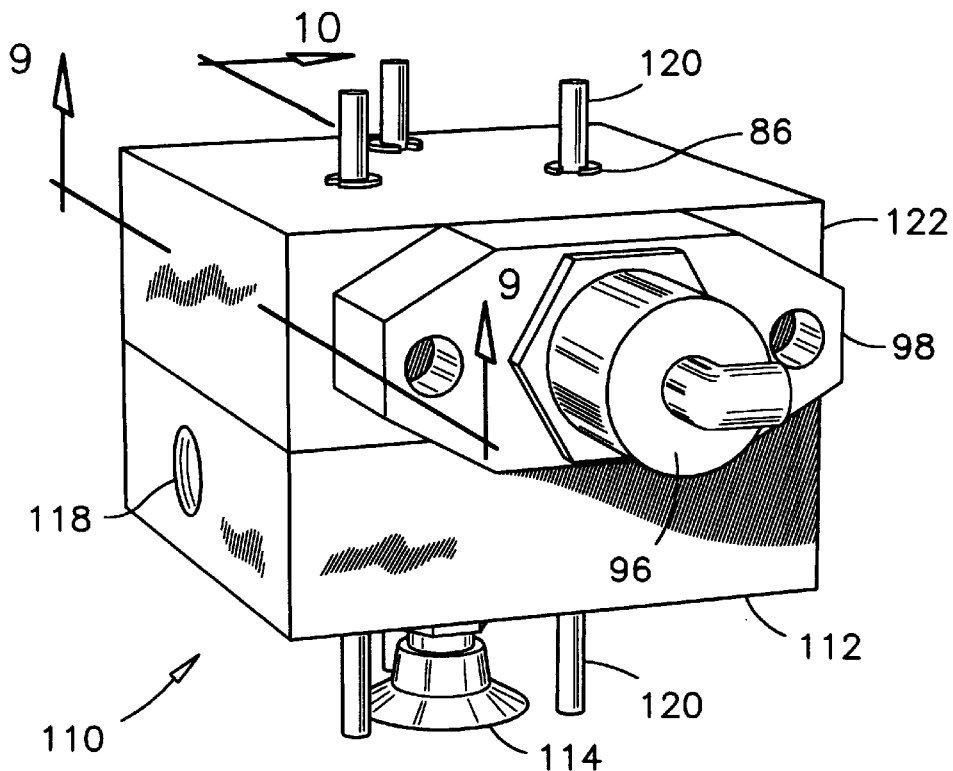
FIG. 8 is a first front, top and left side perspective view of the vacuum pickup device of the ophthalmic lens blocker.
Figure 9:
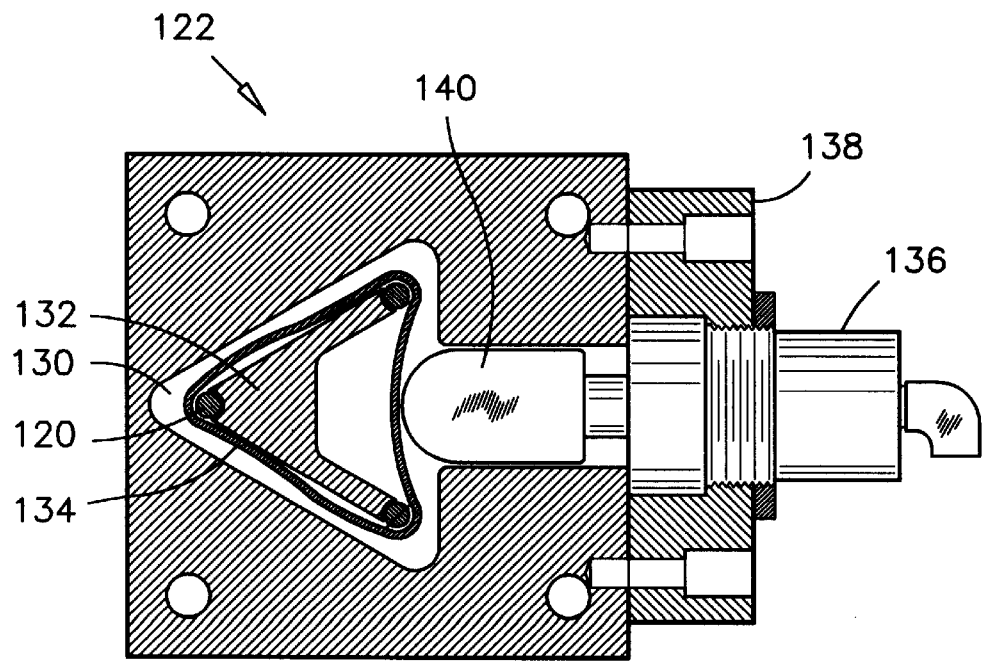
FIG. 9 is a cross-section view of the prop stem locking mechanism as seen along line 9—9 in FIG. 8.

In use, an ophthalmic lens blank 100 is manually placed on the three pegs 82. The image of the lens blank 100 as seen by the camera 58 through the ground glass plate 80 is instantly displayed on the CRT screen 70 with a superposed computer generated template of the prescribed lens. For reference purposes, FIG. 5 illustrates an outline of an actual lens blank 100 and the outline of a bifocal segment 102 on that lens blank. FIG. 6 illustrates a typical template image 104 of an ophthalmic lens being displayed on the CRT screen 70. In this illustration, the template 104 has been rotated by the CPU to show an operator the ideal placement of the bifocal segment 102 for that particular lens blank. An operator of the lens blocker can thereby easily position the lens blank 100 over the peg 82' such that the manufacturer's markings 102 on the ophthalmic lens blank 100 coincide with the computer generated markings 104. FIG. 7 illustrates a screen image of the lens blank 100 superimposed on the template 104 as seen by the camera.

When a proper positioning of the lens blank 100 has been effected, the operator requests the computer to register a first position and angular alignment of the lens blank 100 within a Z-Y plane of a first reference X-Y-Z coordinate system CS-1 in which the Z-Y plane designates an horizontal plane parallel to the top surface 44 of the cabinet, as illustrated in FIG. 3. This coordinate system CS-1 is referred to in the preferred method described hereinbelow as the first coordinate system.

During the positioning of the lens blank as described above, a precise placement of the lens blank over the computer generated template is in some cases, not essential, as will be explained later. The imaging station has the ability, through image analysis, to identify the true position of the contour of the lens blank as well as the alignment of the reference marks on that lens blank. If the lens blank is out of position by an inordinate amount, the CPU requests the operator to reposition the lens blank. Otherwise the CPU will effect the necessary corrections, in the Z-Y plane, to determine the ideal position of the support block on the lens blank and record this ideal position within the Z-Y plane.

Referring now to FIGS. 8, 9, 10 and 11 there is illustrated therein a vacuum pickup device 110 of the lens blank manipulator 48. The vacuum pickup device 110 comprises a manifold block 112 and a vacuum cup 114 connected to a first opening (not shown) through the underside surface of the manifold block 112. A vacuum source and tubing, indicated by label 116 in FIG. 3 are connected to a second opening in the manifold block and are in communication with the first opening. The manifold block 112 further has a third opening 118 communicating with the first opening.

The vacuum pickup device 110 also comprises three prop stems 120 movably extending in a parallel alignment with the central axis of the vacuum cup 114 and forming a triangular formation around the vacuum cup 114. The vacuum pickup device 110 further has a prop stem locking mechanism 122 mounted atop the manifold block 112.

Figure 10:
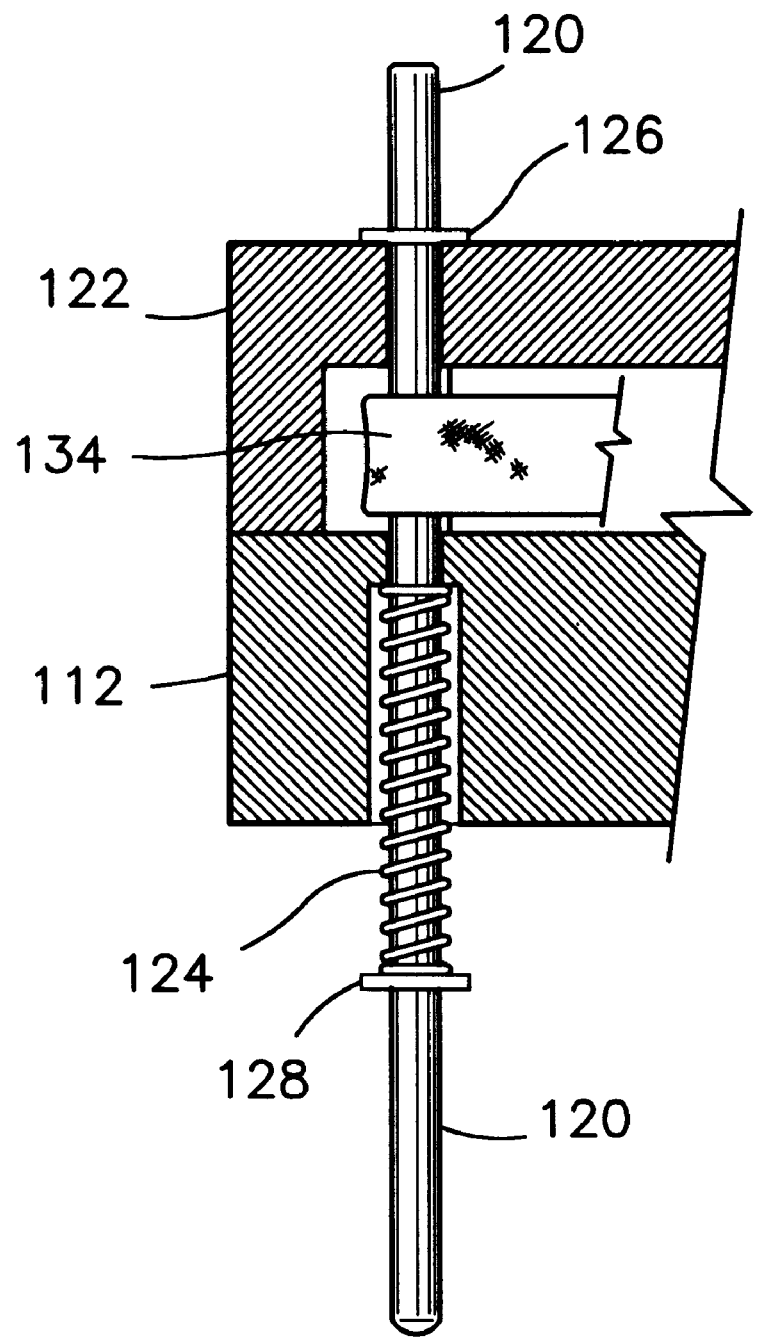
FIG. 10 is a cross-section view through the prop stem locking mechanism and the manifold block of the vacuum pickup device, as seen along line 10 in FIG. 8 and illustrating an elevation view of a prop stem.

The prop stems 120 extend through the prop stem locking mechanism 122 and through the manifold block 112 as illustrated in FIG. 10. Each prop stem 120 is urged downward relative to the vacuum pickup device 110 by a spring 124 mounted over the prop stem. Each spring 124 is seated into a respective recess in the manifold block 112. Each prop stem 120 is held in a respective hole through the prop stem locking mechanism 122 and through the manifold block 112 by means of a first clip 126 mounted on the upper end of the prop stem 120 and a second clip 128 also mounted on the prop stem 120 below the spring 124.

The prop stem locking mechanism 122 comprises a module made of rigid material and having a triangular cavity 130 formed therein. The triangular cavity 130 encloses an A-shaped protrusion 132 extending from a bottom surface of the cavity 130 and having a thickness similar to the depth of the cavity. The A-shaped protrusion 132 and the triangular cavity 130 are concentric with one-another and are positioned such that each of the three extremities of the A-shaped protrusion 132 is contiguous with a surface along one of the prop stems 120. The prop stem locking mechanism 122 further has in the triangular cavity 130, a flat belt 134 enclosing the A-shaped protrusion and the three prop stems 120.

A pneumatic cylinder 136 is affixed to the side of the prop stem locking mechanism 122 by a collar 138 and fasteners (not shown) though the collar 138 and threaded into the rigid module of the mechanism 122. The pneumatic cylinder 136 has an operable plunger 140 extending into the base of the A-shaped protrusion 132. An extending of the plunger 140 pushes upon the flat belt 134 and stretches the flat belt 134 around the three prop stems 120. The tension in the flat belt 134 causes each prop stem 120 to be pulled and held tightly against a respective extremity of the A-shaped protrusion 132.

Although the prop stem locking mechanism 122 described herein comprises a belt circling the three props 120 and a plunger 140 to stretch that belt, it will be appreciated that the described mechanism is only one example among many mechanisms for locking prop stems in fixed position. Accordingly, those skilled in the art of machine design will appreciate that many other mechanisms would also be suitable for carrying out the method of the preferred embodiment.

In the described prop stem locking mechanism 122, the action of the pneumatic cylinder 136 is controlled by the CPU in response to a vacuum sensor switch 142 which is illustrated in FIGS. 3 and 12. The vacuum sensor switch 142 is connected to the third opening 118 in the manifold block and monitors the vacuum level in the vacuum cup supply port.

In operation, the vacuum cup 114 is lowered onto a lens blank 100 and the vacuum cup 114 and the prop stems 120 are brought in contact with the lens blank 100. The vacuum level in the vacuum cup supply port increases and causes the vacuum sensor switch 142 to send a signal to the CPU which in turn activates the pneumatic cylinder 136 for locking the position of the prop stems 120. The lens blank is thereby rigidly retained in the vacuum cup 114.

The raising and lowering movements of the vacuum pickup device 110 are effected by a second linear actuator 150, also shown in FIG. 12. The movements of the second linear actuator 150 are controlled by a second servo motor or a stepper motor/encoder unit 152 such that after an initial calibration, a position of the vacuum cup 114 is always known precisely. When the vacuum pickup device 110 picks up a lens blank 100 from the imaging station 52, the CPU reads the vacuum sensor switch 142 and the signals from the second motor/encoder unit 152 and registers a first vertical position of the back surface of the lens blank 100 relative to a vertical axis, referred to as the X-axis in the first coordinate system CS-1.

Although vacuum cups in general are known to be somewhat flexible, the locked-in-place prop stems 120 ensure that the first vertical position registered by the CPU is maintained throughout the remaining functions of the lens blocker of the preferred embodiment.

Figure 11:
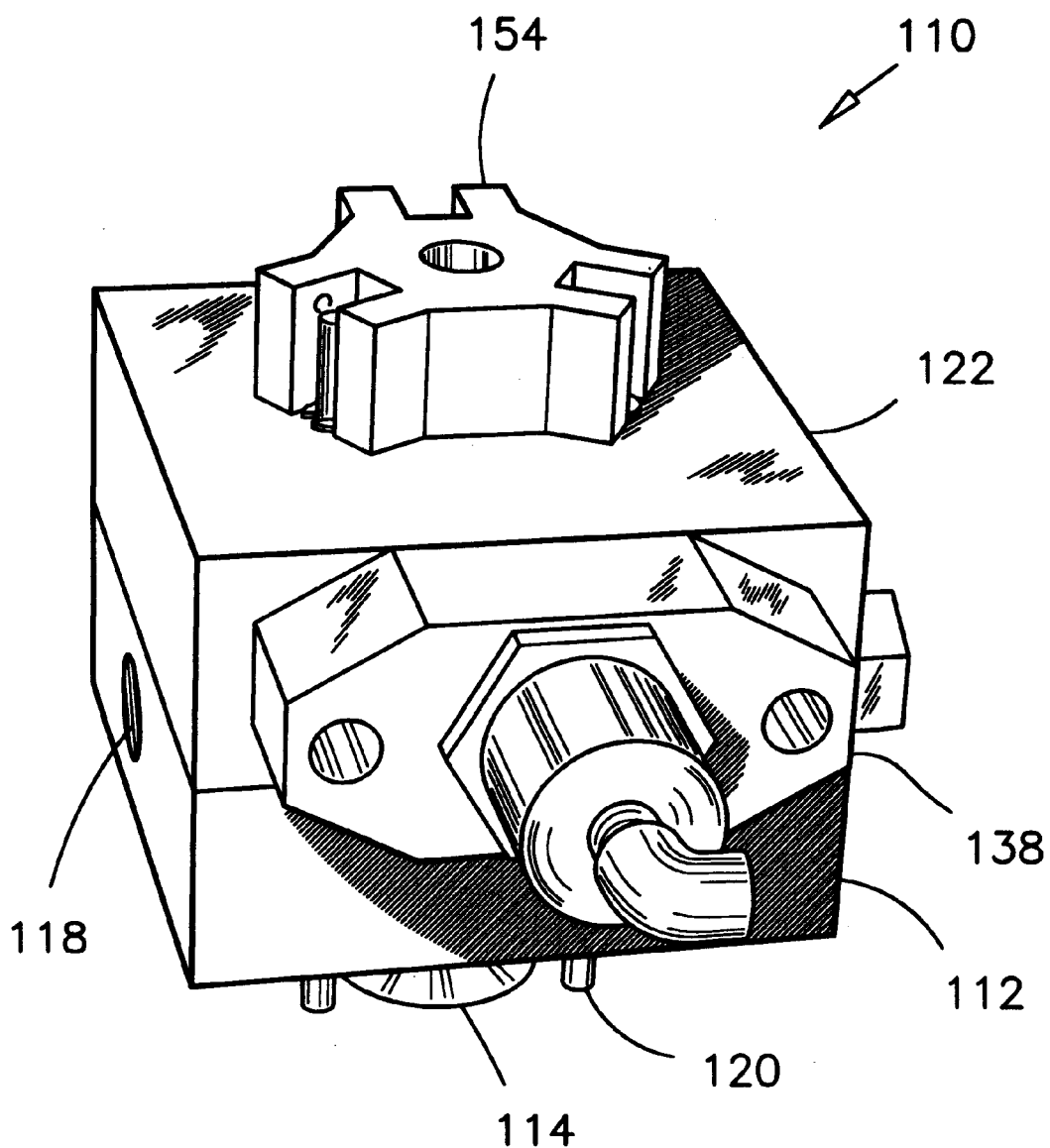
FIG. 11 is a second front, top and left side perspective view of the vacuum pickup device of the ophthalmic lens blocker, having photoelectric switches mounted atop thereof.
Figure 15:
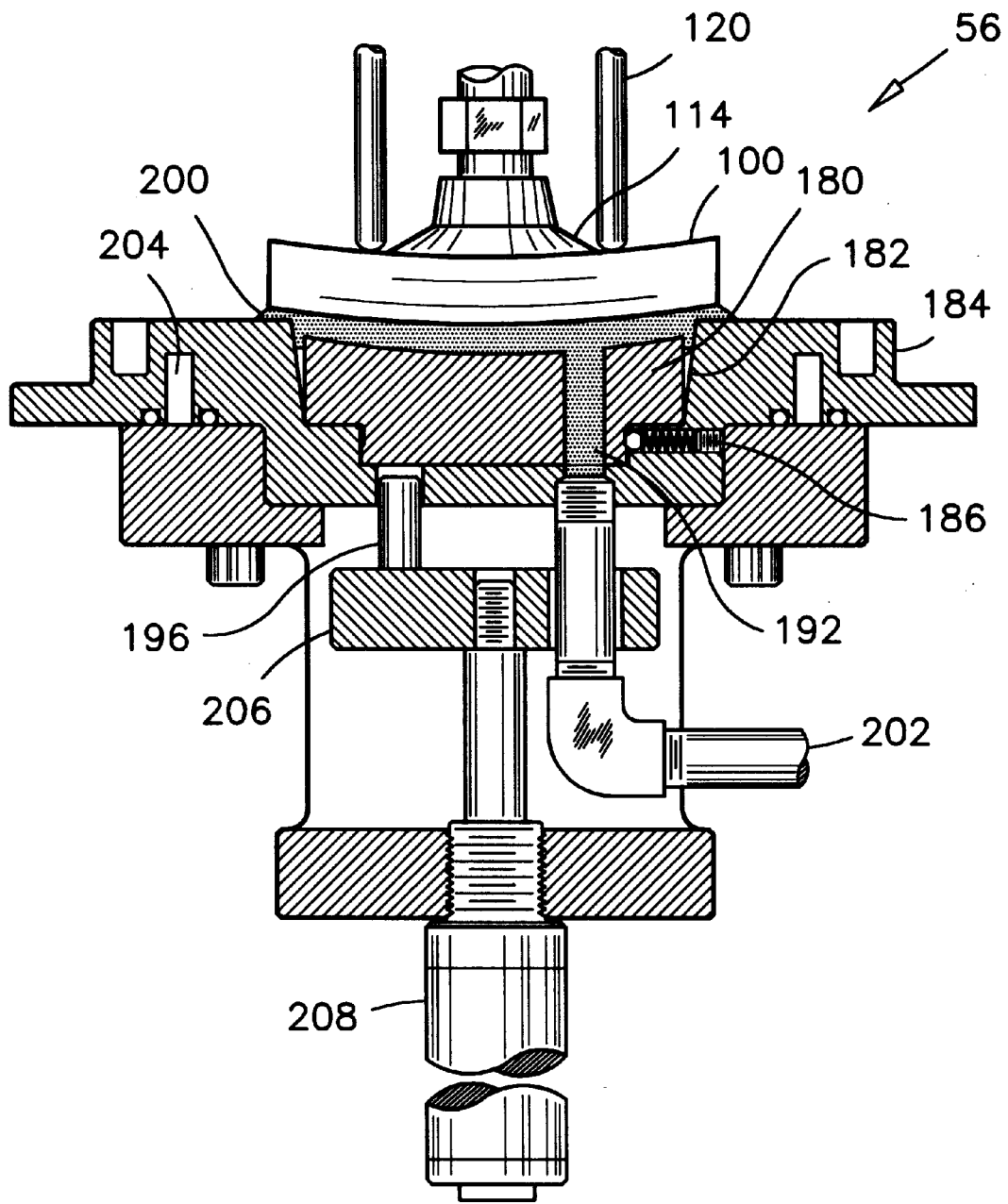
FIG. 15 is a vertical cross-section view of the lens/block molding station of the ophthalmic lens blocker.
Figure 16:
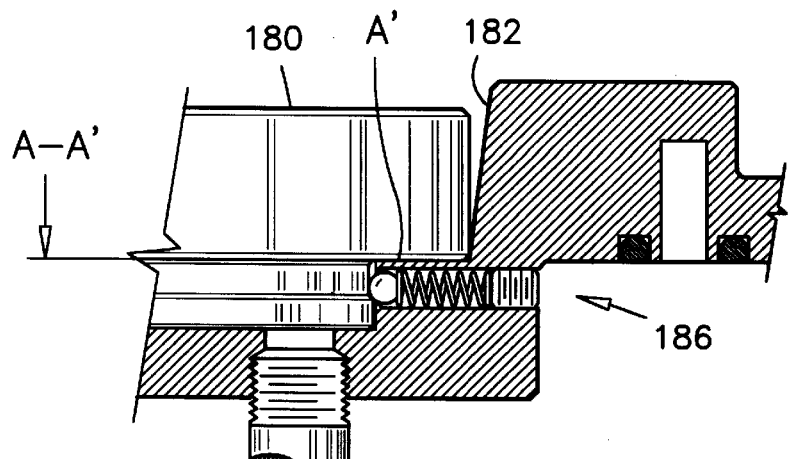
FIG. 16 is an enlarged detail of the cavity inside the lens/block molding station for receiving and holding a support block.

The vacuum pickup device 110 preferably has an electronic module 154 containing photoelectric switches for monitoring a movement of the prop stems 120. The electronic module 154 is preferably mounted atop the prop stem locking mechanism 122, as illustrated in FIG. 11. The signals from the electronic module 154, the signal from the vacuum sensor switch 142 and the signals from the second motor/encoder unit 152 when the vacuum pickup device is brought in contact with the back surface of the lens blank 100 are integrable for determining or verifying the curvature of the back surface of the lens blank 100.

It will be appreciated by the person skilled in the art that an alternate embodiment for the vacuum cup 114 and the vacuum sensor switch 142 described above may be used for obtaining the results contemplated by the vacuum pickup device 110 described herein. Another known type of vacuum cup for example has a rod-like probe mounted centrally therein and a proximity or optical switch for monitoring the position of the probe. This type of vacuum cup may be calibrated to obtain the aforesaid results, and may be preferred by some machine designers and builder to accommodate different configurations of vacuum pickup devices 110 for example. Therefore it will be appreciate that the vacuum pickup device as described herein is not essential for carrying out the method of the preferred embodiment. The inflexibility aspect of the lens holding device 110, however, is indispensable for ensuring that all measurements taken on the lens blank at various stations of the lens blocker are precisely and reliably integrable in a computer environment.

Referring now particularly to FIG. 12, the lens blank manipulator 48 is mounted on a carrier block 156 affixed to the movable member (not shown) of the first linear actuator 50. The control wiring between the CPU and the lens blank manipulator 46 are preferably routed over a flexible cable tray 158 which is affixed to the top surface 44 of the cabinet 42 and to the carrier block 156.

Once the lens blank 100 is held by the vacuum pickup device 110, the lens blank is transported from the imaging station 52 to the probing station 54. The structural details of the probing station 54 are illustrated in FIGS. 13 and 14.

The probing station 54 comprises an array of gauge plungers 160 protruding upwardly through a cover plate 162. The gauge plungers 160 extend under the cover plate 162 and near a circuit board 164 affixed at a distance from the cover plate. The circuit board 164 has a plurality of photoelectric switches wherein each switch comprises a photoelectric emitter 166 and a photoelectric receiver 166'. Each photoelectric switch 166–166' is positioned at closed proximity from a lower end of one plunger 160 for monitoring a downward displacement of that plunger 160.

Each gauge plunger 160 comprises a tubular housing 168 which is affixed to the cover plate 162. A rod 170 is movably mounted in the housing 168 and is urged upwardly by a spring 172. Each rod 170 has a rounded tip 174 extending above the cover plate 162. The circuit board 164 further has a hole 176 between each emitter 166 and receiver 166 for allowing a downward movement of each rod 170 through the circuit board 164 when the rounded tip 174 is depressed.

When the lens blank 100 is the front surface probing station with the front surface of the lens blank 100 contacting the tips 174 of the gauge plungers 160, the CPU reads the encoder of the second motor/encoder unit 152 and the signal from each photoelectric switch 166–166'. The CPU integrates the signals of the encoder and switches 166–166' to determine the shape of the front curvature of the lens blank 100 and a position of this curvature along the X-axis of the first coordinate system CS-1. The details of the front curvature are used by the CPU, together with the details of the back curvature previously obtained, to determine the thickness of the lens blank at the position of the vacuum cup.

Referring now particularly to FIGS. 15–19, the bonding of a lens blank to a support block comprises the step of manually inserting a support block 180 in the cavity 182 of the seat ring 184, or molding ring, of the lens/block molding station 56. The support block 180 is held inside the cavity 182 by a series of spring-ball lock devices 186. The spring-ball devices 186 act upon a groove 190 in the support block for providing a snap-locking action when mounting the block 180 inside the cavity 182 and for retaining the support block 180 inside the cavity 182 such that a first datum plane A on the block 180 is held against a second datum plane A' inside the cavity 182. As will also be appreciated, other chuck means may be used at the discretion of the machine designer or builder to positively retain the support block 180 against the second datum plane A'.

The support block 180 has a hole 192 through the lower surface thereof and a locating notch 194 for indexing the block inside the cavity 182. The mounting of a support block 180 inside the cavity 182 of the lens/block molding station 56 is thereby a precise mounting wherein the plane A relative to the X-axis of the first coordinate system CS-1, the block's transversal axis B and center C relative to the reference axes Z-Y are consistent for all support blocks 180 inserted in the lens/block molding station 56.

The hole 192 extends through the entire thickness of the block 180 such as molten wax 200 can be injected therethrough between the lens blank 100 and the mounting surface of the block 180. The hole 192 is connected to molten wax injection piping system 202 which in turn is connected to the wax heating and pumping unit 62.

A further movement of the lens blank manipulator 48 comprises the transfer of the lens blank 100 from the probing station to the lens/block molding station 56 wherein the lens blank is bonded to a support block 180. Because the position of the front surface of the lens blank 100 along the X-axis is known by the CPU, the lens blank is precisely positioned over the block, with the front surface thereof being at a nominal distance from the mounting surface of the block 180 and from the upper edge of the molding ring 182, in order to achieve all the aforesaid advantages of such mounting. Molten wax 200 is then injected between the support block 180 and the lens blank 100 and is allowed to cool and solidify for bonding the lens blank 100 to the support block 180.

The molding ring 184 has a circular conduit 204 therein for recirculating a coolant from the chiller 64 for cooling the seat ring 184 and the support block 180, and for promoting a rapid hardening of the molten wax 200. The lens/block molding station 56 also has a movable platen 206 holding one or more ejector pins 196. The platen is movable in up and down directions for pushing the ejector pins 196 upwardly and for dislodging the block 180 from inside the cavity 182 when the wax has solidified and the lens blank 100 is bonded to the support block 180. The platen 206 is actuated in up and down directions by a pneumatic actuator 208. Upon dislodging of the blocked lens from the molding station 56, any runoffs of wax 200 is then manually trimmed flush with the lens 100 as shown at 210 in FIG. 19.

Figure 17:
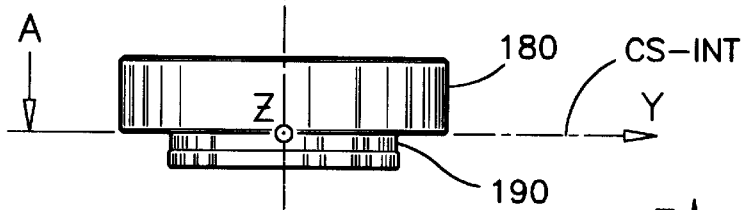
FIG. 17 is a side view of a typical support block used for blocking an ophthalmic lens blank.
Figure 18:
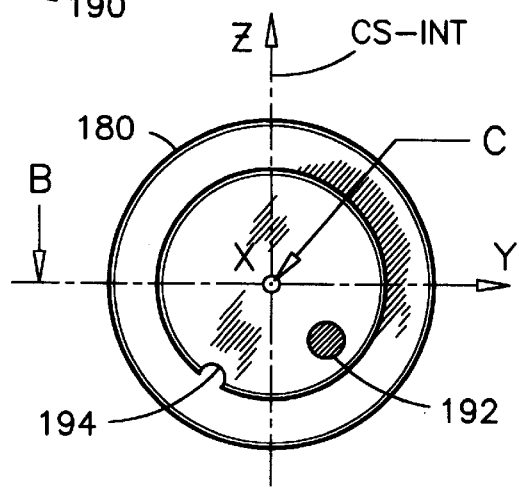
FIG. 18 is a bottom view of a typical support block used for blocking an ophthalmic lens blank.
Figure 19:
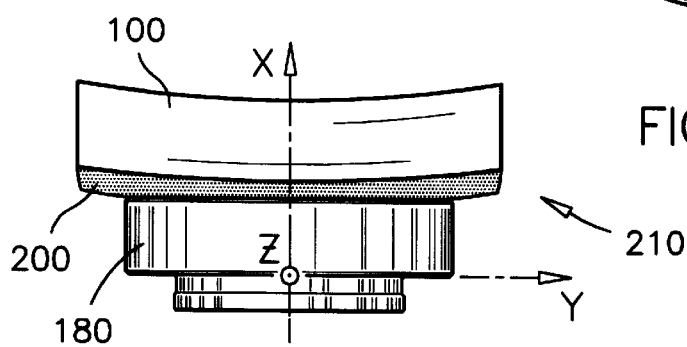
FIG. 19 is a side view of a typical blocked lens blank.

During the blocking of a lens, as will be described later in greater details, an intermediate X-Y-Z coordinate system is assigned to the support block 180. This intermediate coordinate system is similar and coincident to the first coordinate system CS-1, but originates from the support block 180. The intermediate coordinate system CS-INT which is illustrated in FIGS. 17 and 18, and which is referred to as such in the detailed description of the method according to the preferred embodiment, is used by the lab computer, in a computer environment, as a vehicle for transferring all the references of a virtual entity of the support block and of the lens blank mounted on the block, between the first coordinate system CS-1 of the lens blocker 40 and a second coordinate system of a lens generating apparatus.

Figure 20:
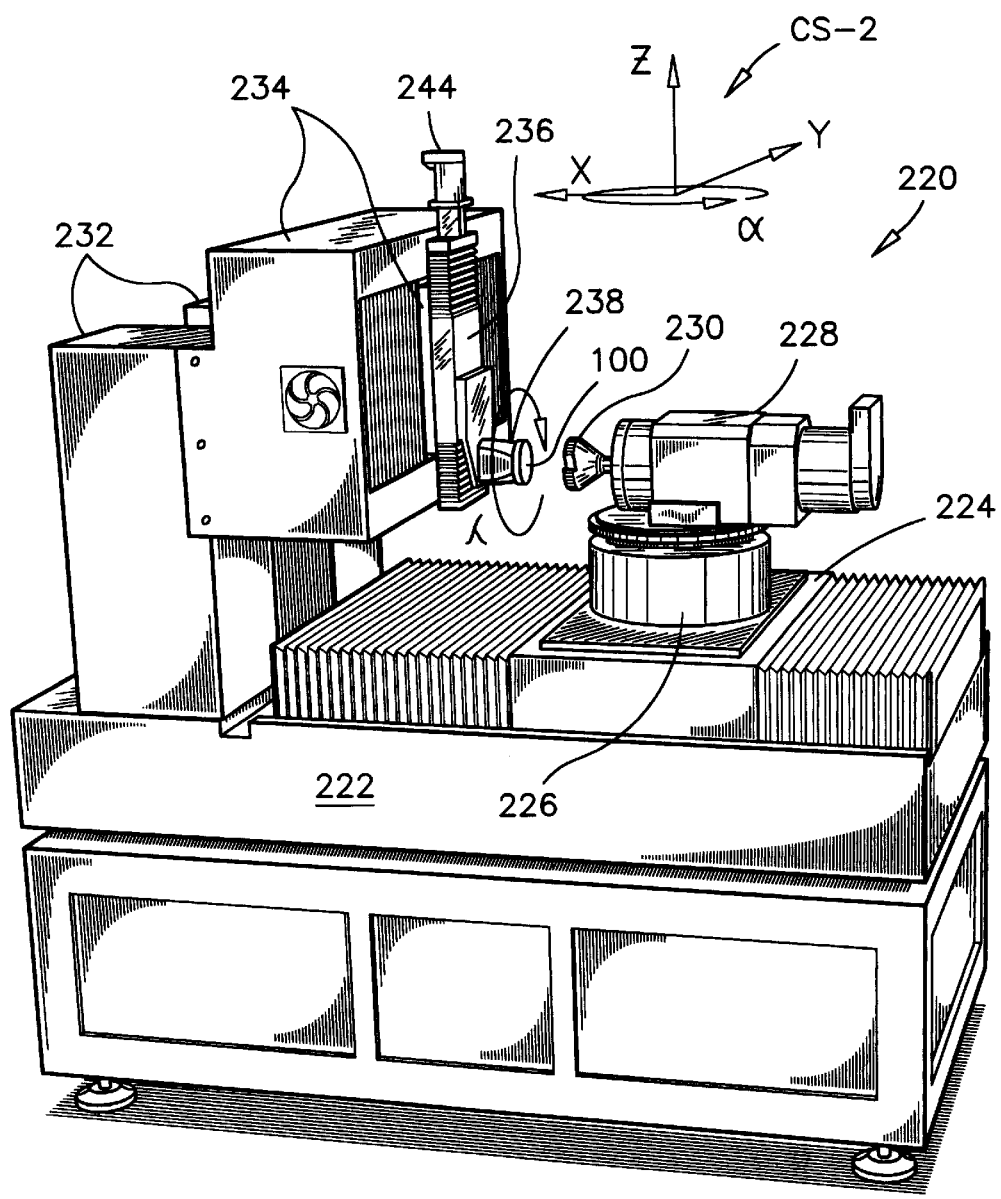
FIG. 20 is a front, left side and top perspective view of the ophthalmic lens generating apparatus used for carrying out the method of the preferred embodiment.
Figure 21:
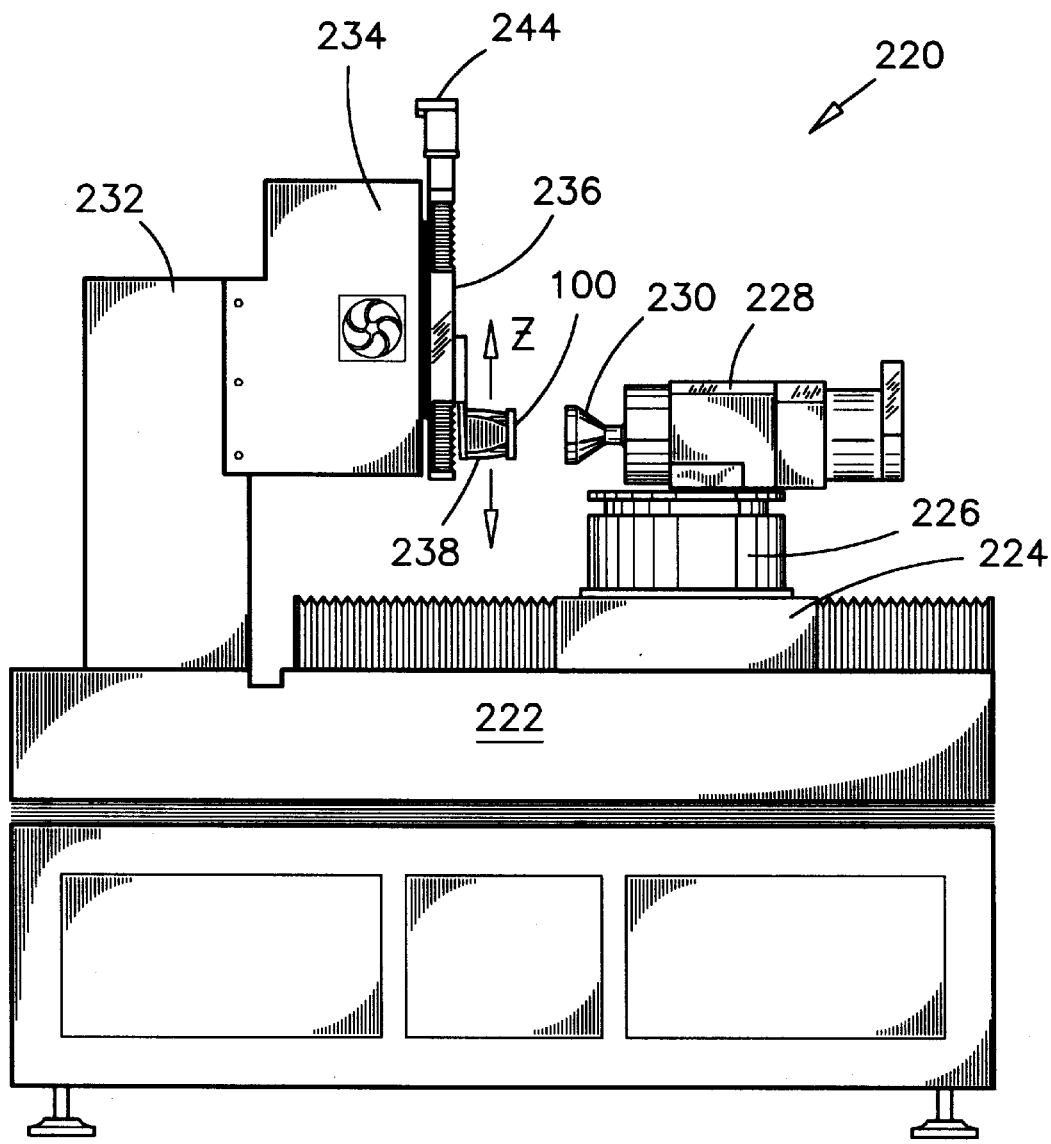
FIG. 21 is a left side elevation view of the ophthalmic lens generating apparatus.
Figure 22:
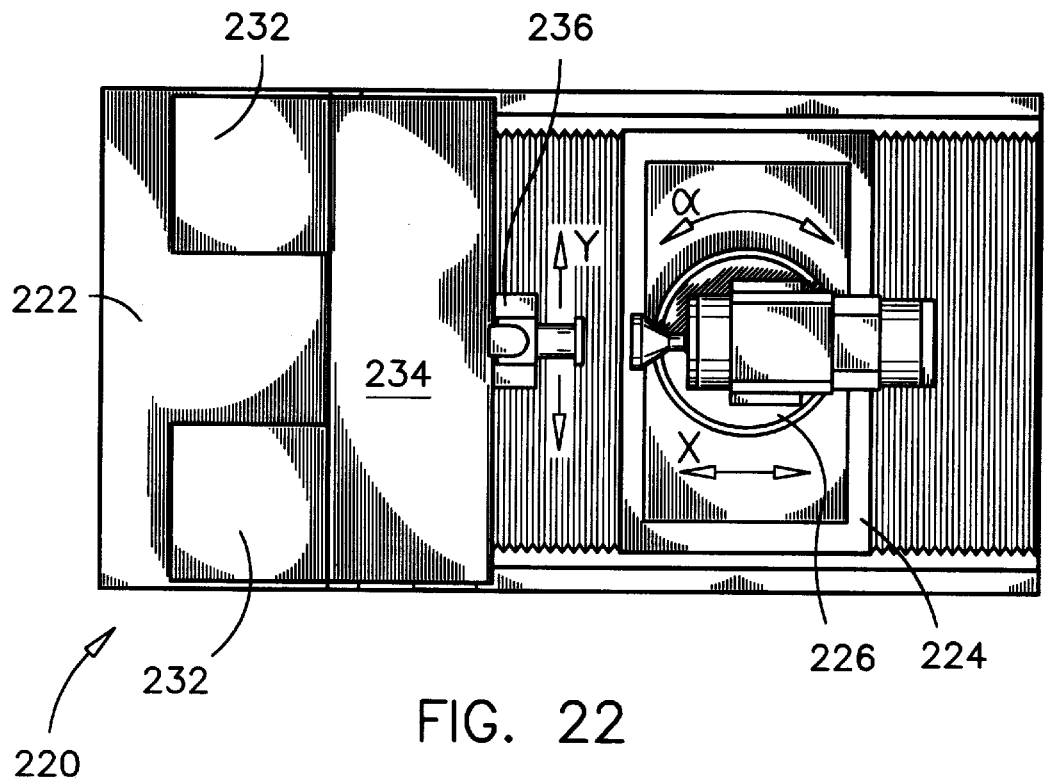
FIG. 22 is a top plan view of the lens generating apparatus.
Figure 23:
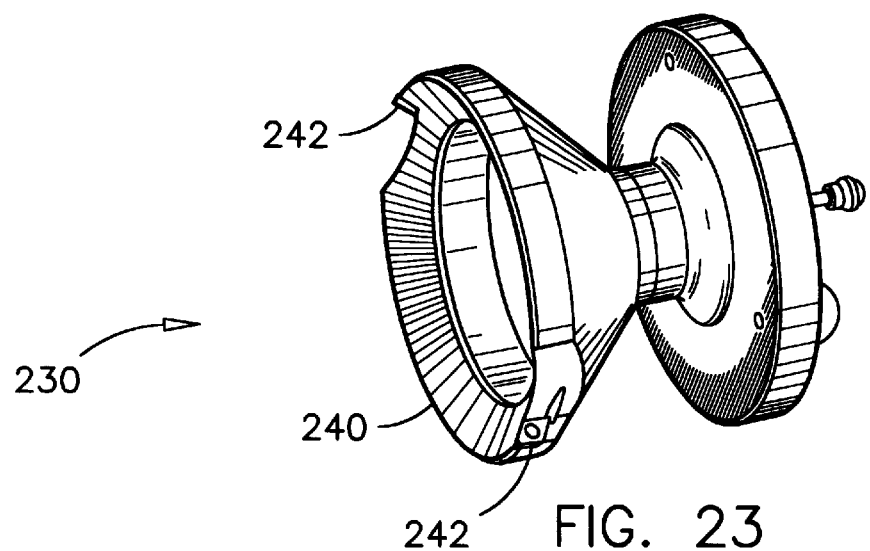
FIG. 23 is a driven end and top perspective view of a typical surface generating cup-shaped tool used on the ophthalmic lens generating apparatus.

In order to carry out the method of the present invention for manufacturing ophthalmic lenses, at least another apparatus is required. This other apparatus is a lens generating apparatus 220 such as illustrated in FIGS. 20–25. The X-Y-Z coordinate system CS-2 associated with his apparatus is illustrated in FIG. 20 and is referred to in the detailed description of the preferred method as the second coordinate system CS-2.

Although it will be appreciated that a number of different lens generating apparatus may be used for carrying out the method of the preferred embodiment, the preferred lens generating apparatus 220 is described hereinbelow.

The lens generating apparatus 220 comprises a massive granite base 222 supporting a first slide table 224 which is movable along the longitudinal axis of the apparatus, hereinafter referred to as the X-axis of the second coordinate system CS-2. A rotary table 226 is mounted on the first slide table 224. The rotary table 226 is rotatable about a designated Z-axis of the second coordinate system CS-2, in a direction designated by α in FIG. 20. A tool spindle 228 is mounted on the rotary table 226 and has a cup-shaped cutting tool 230 affixed to the arbor thereof.

The preferred apparatus 220 also comprises a pair of upright massive granite blocks 232 mounted on one end of the granite base 22. A second slide table 234 is affixed to the upright granite blocks 232 and is movable horizontally in a direction perpendicular to the longitudinal axis, hereinafter referred to as the Y-axis of the second coordinate system CS-2. The second slide table 234 supports a third slide table 236 and a lens holder 238, in which an ophthalmic lens blank 100 is mountable. The third slide table 236 is movable vertically along the designated Z-axis, and the lens holder 238 is rotatable about an axis parallel to or coincidental with the longitudinal X-axis, in a direction represented by λ in FIG. 20.

Because a number of lens generating apparatus 220 do not have a rotatable lens holder 238, the method of the preferred embodiment comprises variances to accommodate for the presence or absence of this option, as will be understood later.

The orthogonal X-Y-Z axes of a second coordinate system CS-2 are relatable to the axes of the first and intermediate coordinate systems CS-1 and CS-INT referred to hereinbefore, such that computer data of a virtual entity of the lens blank and support block are transferrable between the first coordinate system CS-1 and the intermediate coordinate system CS-INT, and from the intermediate coordinate system CS-INT to the second coordinate system CS-2. It will be appreciated that the three coordinate systems described herein are sometimes described as being inherent a respective physical entity to facilitate a comprehension of the present specification. In reality, these coordinate systems consist of imaginary axes that are used only in a computer environment to consolidate programming instructions between the two apparatus and a user of these apparatus.

The cutting tool 230 of the apparatus comprises a cup-shaped body 240 having at least two cutter inserts 242 made of a material containing tungsten-carbide or similar elements. When the machine is equipped with a tool changer, which has not been illustrated herein for being common in the art, a number of cutting tools may be used to perform for example, a roughing cut and a finishing cut, or for selecting tools according to their specific diameter for minimizing optical errors in a lens as will be explained later.

The slide tables 224, 234, and 236 and the rotary table 226 are preferably mounted on high precision pressurized fluid bearings. The slide tables are actuated by high-precision, linear-type servo-actuators. Since such fluid bearings and linear servo-actuators are well-known generally, they have not been illustrated, except for reference purposes, part of the actuator of the third slide table 236 is indicated by numeral 244 in FIGS. 20 and 21.

Figure 24:
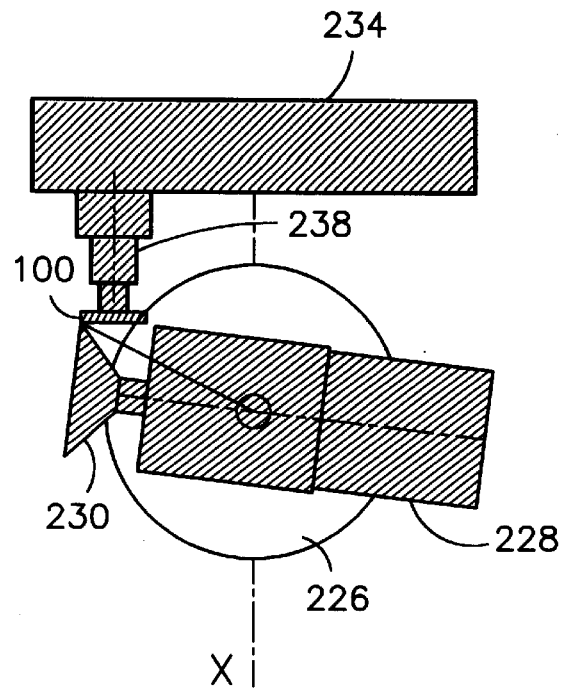
FIG. 24 is a schematic plan view of the lens generating apparatus showing the position of the tool spindle at the beginning of a cut relative to the lens blank, in an example of a lens generating process.
Figure 25:
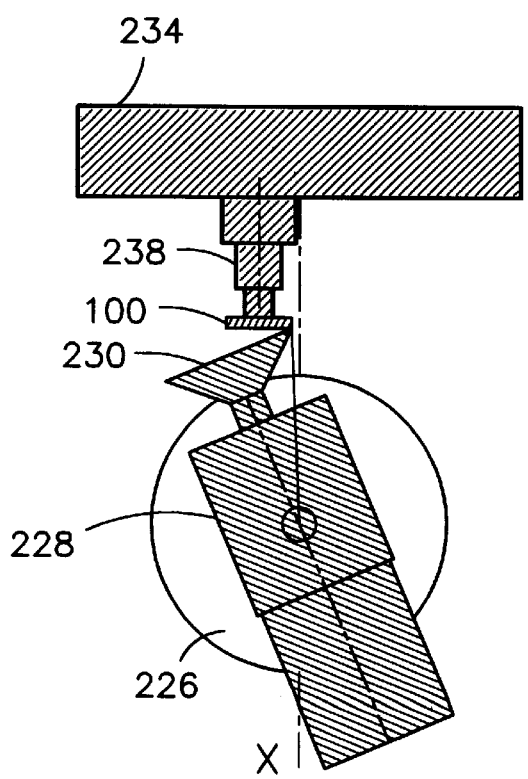
FIG. 25 is a schematic plan view of the lens generating apparatus showing the position of the tool spindle at the end of a cut relative to the lens blank in the example of a lens generating process.

A preferred method of operation of the apparatus for generating ophthalmic lenses is partly explained by means of an example illustrated in FIGS. 24 and 25. In FIG. 24, the initial position in the tool spindle 228 at the beginning of a cut is represented therein. The final position of the tool spindle 228 at the end of a cut is illustrated in FIG. 25. The cutting of the lens surface is done by rotating the rotary table 226 in the clockwise direction when looking at the apparatus from the top. The engagement of the cutting tool 230 with the lens blank 100 during a cut is effected starting at the far edge of the lens blank 100 and moving through the surface of the lens blank 100 toward the inside edge of the lens blank 100. The cutting tool 230 typically contacts the lens blank 100 in a retracting motion against the surface of the lens blank 100, although a forward movement is also possible.

The compound movement of the tool 230 along the X-axis contributes largely to the precision of the preferred apparatus and to the outstanding surface qualities which are obtainable on the ophthalmic lenses generated by the preferred apparatus. The surfaces generated by the preferred apparatus are final finishes, and no further polishing is required.

Other advantages of the compound movements of the cutting tool 230 include the ability of the preferred apparatus to generate a multiple of surfaces on optical lenses. To name a few, the preferred apparatus can generate concave and convex surfaces, flat surfaces, toroidal surfaces, straight cylindrical surfaces, saddle point surfaces, elliptical toroidal or other complex surfaces. The preferred apparatus can also add prism to a generated lens without inclining the lens relative to its axis.

Having explained the structural characteristics of the preferred first and second apparatus for carrying out the method of the preferred embodiment, this method is explained hereinbelow in details. In this method, the blocker's CPU, the generator's CPU and the lab computer are often used individually or in association with each other. However, for textual clarity these computers, whether used individually or in combination, are hereinafter also referred to as the system computer.

DESCRIPTION OF THE PREFERRED METHOD

The method of according to a preferred embodiment of the resent invention is carried out with a lens blocker as described above, and with a lens generating apparatus that has or does not have a rotatable lens holder 238. In the latter case, greater care must be applied to do a proper placement of the lens blank relative to the displayed template at the imaging station of the lens blocker.

Prior to analysing an image of a lens blank, and probing the lens blank, the lab computer in cooperation with the blocker's CPU generate a prescribed model of the lens blank in a computer environment. This prescribed model is built using the manufacturer's specifications of the prescribed lens blank as registered in the lab computer's databases.

The prescribed model is analysed to determined the characteristics of the prescribed lens, the availability of lens surfacing tools at the lens generating apparatus for generating the lens surface, the ideal tool paths to be used during the lens generation process, and the placement of the lens blank in the lens generating apparatus to obtain the best lens quality. This information is translated into an ideal mounting of the lens blank to the support block, and is related to the initial placement of the lens blank at the imaging station to obtain the ideal lens blocking.

A template image of the lens blank is then generated and displayed on the CRT screen. Using this template, an operator is able to manually orient the lens blank according to the displayed template as explained before.

From then on, as the lens blank is scanned and measured, an accurate virtual entity of the lens is built and compared to the prescribed model. If the two entities do not differ substantially from each other, the method is carried out as described hereinbelow. If the virtual entity is found to have an inordinate difference with the prescribed model, the operator is prompted to verify, reposition or replace the lens blank if appropriate and start the process over.

It will be appreciated that when the lens generating apparatus used for carrying out the process has a rotatable lens chuck 238, a proper alignment of the lens blank at the imaging station is of secondary importance and can be approximated.

During the imaging, measuring and probing of a lens blank 100, the CPU of the ophthalmic lens blocker registers the Z-Y coordinates of the geometric centre of the lens blank relative to the first coordinate system CS-1, the position and orientation of the bifocal segment and manufacturer's markings, and the spatial position of the lens blank's front curvature relative to the Z-Y axes. It also registers the shape and location of the front surface of the lens blank along the X-axis of the first coordinate system CS-1, the shape and position of the back surface along the X-axis and the thickness of the lens blank. At that stage the lab computer in cooperation with the blocker's CPU generate the accurate virtual entity of the lens blank in a computer environment.

During the blocking of the lens blank 100, the virtual entity of the lens blank is related to the coordinates of the datum plane A, transversal axis B and centre C of the support block 180. The accurate virtual entity, the lens blank and block assembly are also assigned an identification code by the CPU under which the above mounting specifications are registered in the memory of the CPU or transferred into the memory of the lab computer. The data, spatial coordinates and identification code are later used in other apparatus communicating with the lab computer for working the lens blank according to the specifications of a prescription.

In that respect, the block 180 is preferably bar coded or otherwise permanently identified. The molding station 56 as well as other machines described before preferably have bar code readers (not shown) such that the blocked lens 100 is associable with a specific block 180 and its structural features are recognizable by the lab computer throughout the entire lens generating process.

The method according to the preferred embodiment for generating an ophthalmic lens is explained herein in greater details. This method comprises the steps of:

Step 1) Entering a prescription for an ophthalmic lens or for a pair of lenses in the system computer;

Step 2) Using a databank of lens blank specifications, the system computer generates a prescribed model of the lens blank in a computer environment;

Step 3) The system computer uses the prescribed model of the lens blank to calculate the ideal tool paths to be carried out during the lens generation process, and the ideal lens orientation relative to the lens block in order to carry out the ideal tool paths;

Step 4) The system computer generates a template of one of the prescribed lenses and defines the specifications of a lens blank to be used to meet the requirements of the prescription. The system computer displays the details of the selected lens blank on the blocker's imaging station 70;

Step 5) An operator positions a requested lens blank on the imaging station 70, with the front surface thereof facing down. The lens blank is positioned to match the computer-generated template Step 6) The system computer scans and analyses the image of the lens blank using image analysis, and determines the contour of the lens blank, the position and alignment of the bifocal segment if present and of other reference markings on the lens blank;

Step 7) The system computer defines a first spatial coordinate system CS-1 and assigns this coordinate system to the structure of the lens blocker. The system computer registers a position of the lens blank's contour, bifocal segment if applicable and reference markings within this first spatial coordinate system CS-1;

Step 8) The system computer also registers a position of the manipulator 48 within this first spatial coordinate system;

Step 9) The blocker's lens blank manipulator 48 under the control of the system computer is moved over the imaging station and is lowered onto the lens blank 100, while measuring a back curvature of the lens blank and a position of this curvature within the first spatial coordinate system;

Step 10) The blocker's lens blank manipulator 48 moves the lens blank 100 over the probing station 54 and lowers the front surface of the lens blank onto the probing station;

Step 11) The system computer determines by probing, a curvature of the front surface of the lens blank, a thickness of the lens blank and a location of the front curvature relative to the first spatial coordinate system CS-1;

Step 12) The system computer verifies that the lens blank selected in the proper one and that its characteristics match the specifications of the prescribed model. If these conditions are not met, the systems computer requests the operator to replace or reposition the lens blank 100 at the imaging station, or to acknowledge and override the request;

Step 13) The system computer translates the collected information about the lens blank 100 into an accurate virtual entity 100' of that lens blank and assigns the virtual entity a position relative to the first spatial coordinate system CS-1;

Step 14) The system computer reads the position of a first datum plane and a first angular reference alignment in that datum plane of a first reference cavity at the blocking station 56 and associates this position and angular alignment to the first spatial coordinate system CS-1;

Step 15) An operator places a support block having a unique identification code into the first reference cavity, in a specific position relative to the first datum plane and to the first angular alignment of the first reference cavity;

Step 16) The system computer registers the specific position of the support block relative to the first spatial coordinate system, and reads the block's identification code;

Step 17) The system computer defines an intermediate coordinate system CS-INT and relates the references of the support block relative to the first spatial coordinate system, to the intermediate coordinate system;

Step 18) While monitoring the position of the virtual entity 100' of the lens blank relative to the first spatial coordinate system, the lens manipulator 48 moves the lens blank 100 to the blocking station 56, and hold the lens blank 100 above the molding ring 182 of the blocking station and above the support block 180.

Step 19) The system computer causes the blocker's equipment to inject molten wax between the support block 180 and the lens blank 100, while metering the quantity of wax being injected according to the space to be filled between the lens blank and the block;

Step 20) The system computer associates the characteristics of the virtual entity 100' to the intermediate coordinate system CS-INT;

Step 21) When the wax has solidified and bonded the lens blank 100 to the support block 180, the blocker's equipment causes the blocked lens to be pushed out of the blocking station, for transport by an operator to the lens generating apparatus 220;

Step 22) The lens generating apparatus 220 has a lens surfacing tool and a second reference cavity having a second datum plane and a second angular alignment within this second datum plane. The system computer defines a second spatial coordinate system CS-2 and defines a position of the surfacing tool and the second reference cavity in the second spatial coordinate system;

Step 23) An operator places the blocked lens blank 100 in the second reference cavity;

Step 24) The system computer associates the characteristics of the virtual entity 100' of the lens blank relative to the intermediate coordinate system CS-INT, to the second reference cavity and to the second spatial coordinate system CS-2;

Step 25) The system computer analyses the virtual entity, the lens generating apparatus and the surfacing tools available for use with the lens generating apparatus, and confirms or re-defines the deal tool paths for generating the prescribed lens.

Step 26) The system computer analyses the ideal tool paths and verifies that the tool, tool chuck or tool arbor will not collide with the lens blank or other components of the apparatus. If these conditions are met the system computer programs the ideal tool paths into the lens generating apparatus. Otherwise, alternate tool paths and tool selections are considered until an ideal tool-configuration-and-path condition is found;

Step 27) The lens generating apparatus generates a surface on the lens blank while the system computer monitors a position and displacement of the lens surfacing tool in the second spacial coordinate system relative to the virtual entity 100' of the lens blank;

Step 28) When the lens generator is equipped with a tool changer, a first tool is generally used to do a roughing cut, a second tool is used for finishing the generated optical surface, and subsequent tools are used for contouring or chamfering the lens blank 100.

Step 29) An operator moves the generated lens to subsequent lens surface treatment processing stations.

The advantages of this method are numerous and include the fact that the computer generated template may be calculated on the basis of a geometric centre blocking method or an optical centre blocking or a compromise between the two. The blocker's CPU in cooperation with the lab computer choose the best lens placement relative to the block for generating the required prescription. This placement is shown on the imaging CRT 70, and the lab computer does the required surfacing and motion control calculations to position the optical centre or major reference point where it should be relative to the support block 180. Since all the physical characteristics of a lens blank are known precisely, it is possible for the lab computer to analyse the virtual entity 100' of the lens blank, to anticipate a final result and to calculate a best approach to a lens generating process. It is also possible to simulate a number of possible work plans and select the one that will provide the best lens quality.

Because the lens blank never physically comes into contact with either the block or the blocking ring, and because of the system's ability to probe and determine the spatial orientation of the lens blank's front surface, the described system has the ability to adjust decentration, to add prism and to correct for any tilt in the lens. Therefore, lenses with raised, segmented multi-focal, progressive fronts, or any non-spherical front surface are always blocked accurately.

Examples of calculations, simulation and analyses that are possible with the system described herein are best explained using graphic illustrations. The illustrations in FIGS. 26–33 are presented herein to illustrate a few typical analyses that are doable by the system computer, prior to begin surfacing a lens.

EXAMPLE #1

Single Vision Lens

Figure 26:
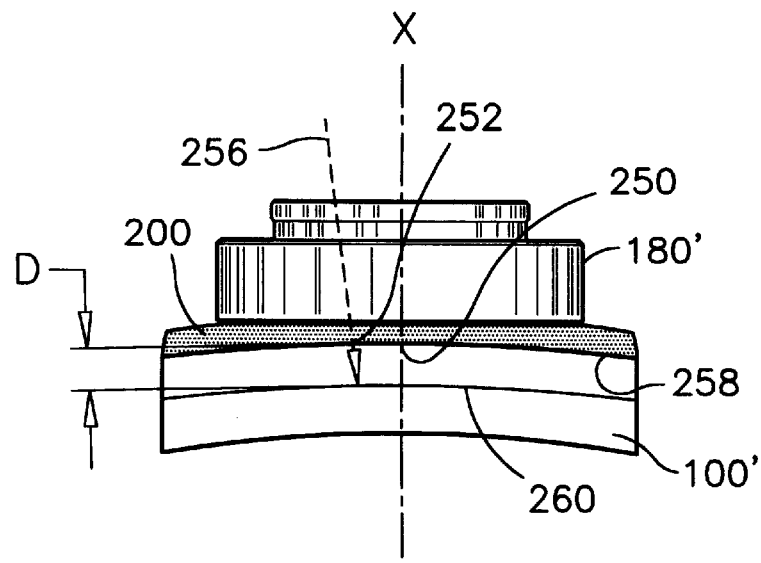
FIG. 26 is a side view of a virtual entity of a single vision lens, as generated by the lab computer for the purpose of defining ideal tool orientation and tool path.
Figure 27:
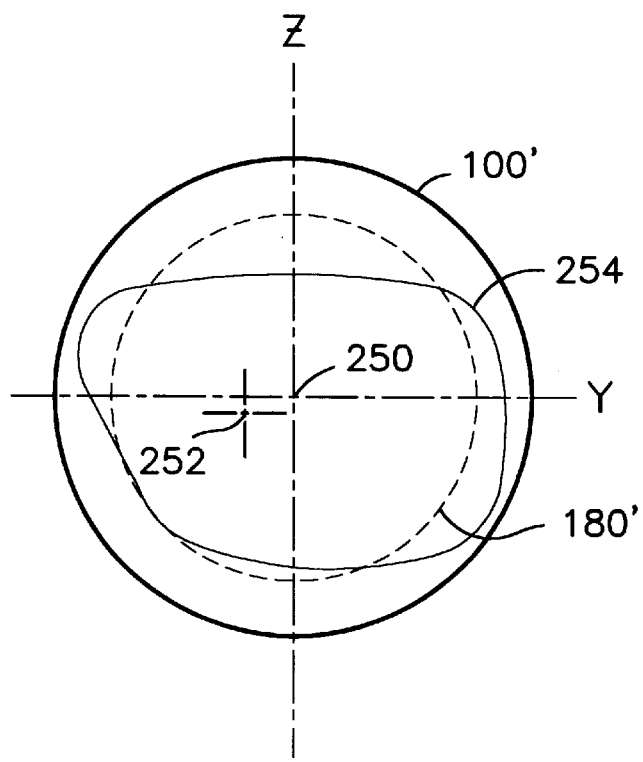
FIG. 27 is a computer generated template of a single vision lens.

FIGS. 26 and 27 illustrate a computer-generated template of a virtual entity 100' of a single vision lens blank, and a side view of this virtual entity 100'. In this instance geometric centre blocking is used, so the geometric centre 250 of the lens entity 100' is centred on the support block 180'. The location of the major reference point 252 and eye glass frame outline 254 are obtained from the system computer. The system computer locates the major reference point 252 on the front surface in three dimensions using the location and curvature of the front surface obtained from probing. The system computer traces a ray 256 through the major reference point 252, normal to the front surface 258. The ray 256 extends into the lens' entity 100' a distance 'D' equivalent to the thickness of the lens to be generated at the major reference point 252, as calculated by the system computer. The back surface 260 is then defined at this point with the radii thereof calculated using the thick lens equation, which is well known in the art. In the example shown, there is no prescription prism, so the back surface 260 is parallel to the front surface 258 at the major reference point 252. According to these information, a quantity of material to be removed from the lens blank and a number of passes are calculated precisely. The system computer then selects the best tools and tool paths which will be required for cutting and generating a back surface 260 on the physical equivalent to the virtual entity 100'.

EXAMPLE #2
Single Vision Lens with Prism

Figure 28:
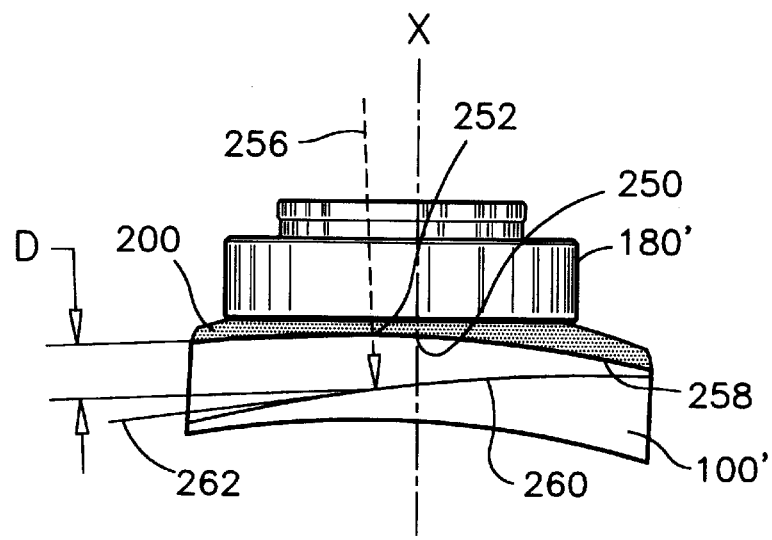
FIG. 28 is a side view of a virtual entity of a single vision lens having prescribed prism.
Figure 29:
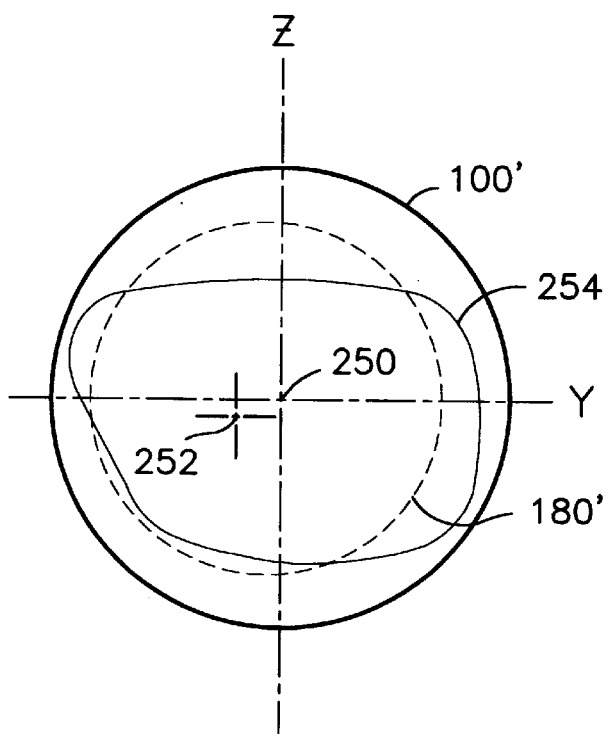
FIG. 29 is a computer generated template of a single vision lens having prescribed prism.

The illustrations in FIGS. 28 and 29 represent a virtual entity 100' of a single vision lens with added prism. Lenses with high positive front curves and a large amount of prism are typically blocked with the blank's geometric centre offset from the block centre, which is also called "skewing". The system computer calculates the distance from the centre of the block to the blank's geometric centre based on geometrical constraints on the lens blank. The blocker's CPU displays a template for the operator, showing where to place the lens blank. When the lens blank has been positioned at the imaging station, the system computer analyses the offset position of the lens blank and calculates the required tool paths accordingly. The location of the back surface 260 is found in a similar manner as previously explained, by tracing a ray 256 through the major reference point 252. Because there is prism in the lens, the back surface 260 is not parallel to the front surface 258 at the major reference point 252. This characteristic is illustrated by a line 262 tangent to the back surface 260 at the major reference point 252 in the back surface.

EXAMPLE #3
Cutting a Progressive or Multi-Focal Lens Curvature

Figure 30:
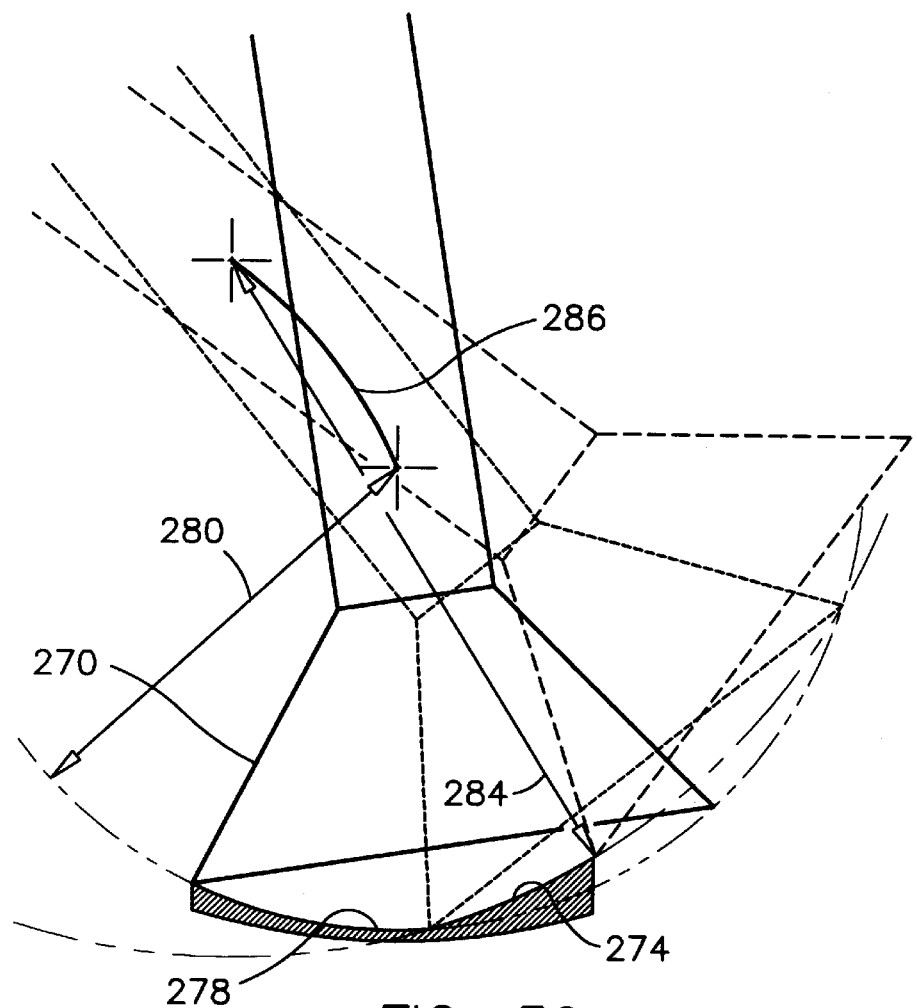
FIG. 30 is a schematic top view of a cup-shaped tool generating a back surface on a virtual entity of a progressive lens.
Figure 31:
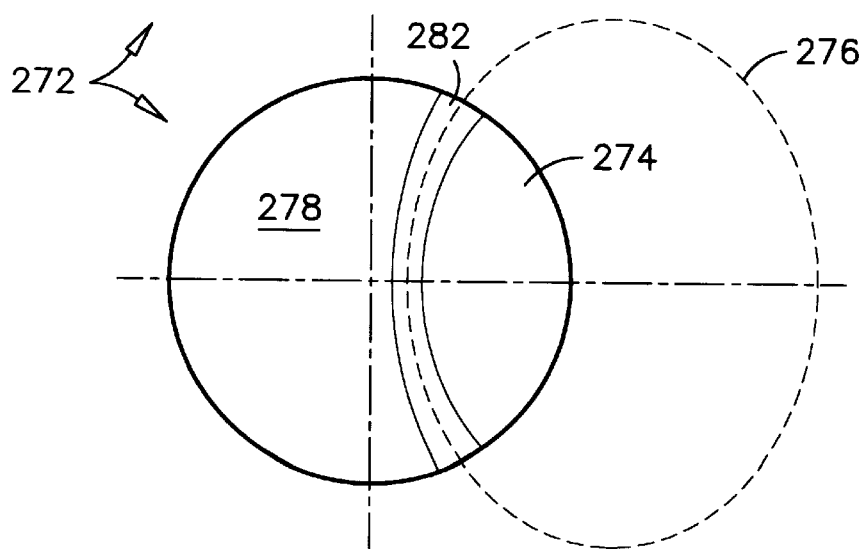
FIG. 31 is a plan view of the virtual entity of a progressive lens shown in FIG. 30.

Another notable advantage of the method of the preferred embodiment when used in combination with the lens blocker 40 and lens generator 220 described herein is that this system is usable for generating multi-focal and progressive lenses having distinct characteristics. As illustrated in FIGS. 30 and 31, a cup shaped tool 270 is usable for generating a multi-vision lens 272 in one operation, wherein the near vision portion 274 is defined by an elliptical arc 282 extending the full width of the lens 272.

In this method, a virtual entity of the lens blank and a proposed tool path of a cup-shaped tool on a surface of the lens blank are analyzed. The characteristics of all three regions to be generated on the lens are also analyzed. The optical errors in each region are evaluated. Various tool paths are considered, and ideal tool paths are determined.

In a broad form, a preferred method for generating a progressive lens comprises the steps of; selecting a tilt angle or a elliptical outline 276 for a cup-shaped tool 270 for generating a first prescribed dioptric curvature on the back side of the lens; simulating two or more tool paths using a virtual entity of a lens blank and of a cup-shaped tool to be used in the process; and selecting ideal tool paths. The lens generating apparatus generates a far vision portion 278 having a first radius 280 of curvature using a first tool outline 276. The apparatus generates a progressively varying intermediate vision region 282 while changing the radius of curvature of the surface from the radius 280 of the far vision region to the radius 284 of the near vision region. The equation for the segment 286 between the origin of the two radii 280,284 of curvature may be adjusted to obtain various characteristics for the intermediate region 282, such as width and rate of progression for example. Then the lens generating apparatus generates a near vision portion 274 having the second radius 284 of curvature.

The progressive lens thus generated has a near vision portion 274 defined by an arcuated boundary 282 which extends the full width of the lens and that has consistent power and cylindrical axis over the full width of the lens.

EXAMPLE #4
Alternate Axis Cutting

Figure 32:
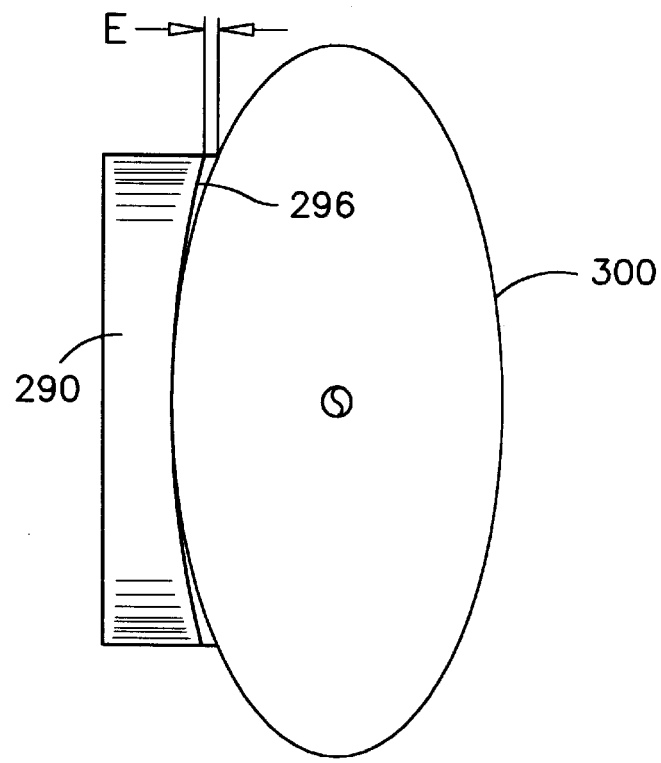
FIG. 32 is a side view of a computer-generated simulation of a cup-shaped tool generating a back surface on a lens.
Figure 33:
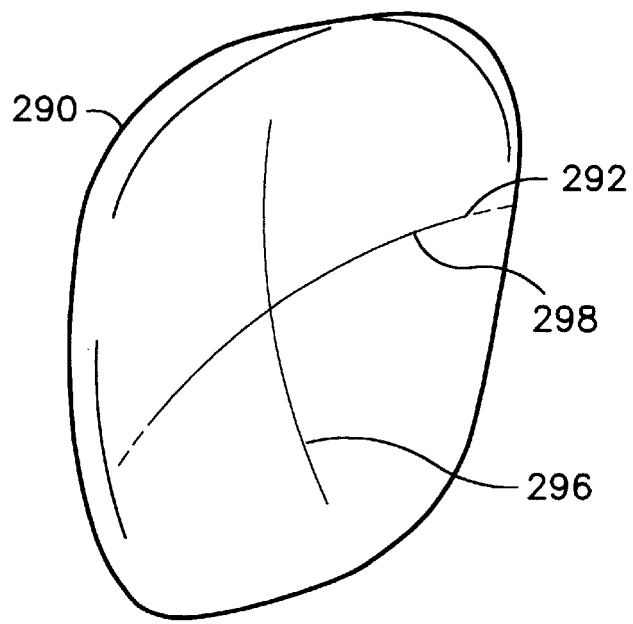
FIG. 33 is a perspective view of an ophthalmic lens, showing for reference purposes the cylindrical axis and spherical and cylindrical meridians thereof.

A further noteworthy advantage of the method of the preferred embodiment is that the system computer has the ability to analyze a virtual entity of the lens blank, and to decide the best mode for generating a surface on that lens blank. As previously mentioned, it is further possible for the system computer to simulate two or more tool paths, to estimate elliptical errors in each possible tool path and to select the best tool and best lens orientation for ensuring minimum error. FIGS. 32 and 33 are used to explain a preferred method for simultaneously reducing elliptical error and the edge thickness in a toroidal lens.

As known in the industry, a majority of optical lenses have spherical power, cylindrical power and cylindrical axis components, to correct astigmatism. In the illustrated example, a lens 290 is shown with the cylindrical axis 292 aligned substantially horizontally. In standard negative cylinder notation, the cylindrical meridian 296 is perpendicular to the spherical meridian 298, and the cylindrical axis 292 is coincident with the spherical meridian 298.

For reference purposes, these lens are generated on the prior art lens generators such that the cylindrical axis is aligned horizontally, or along a tool path of these machines. This is a conventional practice that is important to maintain the alignment of the lens surface with the conformal lapping tools used in a fining and polishing operation. In the method according to the preferred embodiment, however, the optical surface generated by the preferred lens generating apparatus 220 is a final finish and no further polishing is required. Therefore, the alignment of the lens' cylindrical axis is not restricted by the conventional process and can be generated horizontally or vertically.

With respect to the above and to a lens generating process of the prior art, the cylindrical meridian 296 is normally oriented vertically, that is at right angle with the tool path. In these processes, a cup-shaped tool is tilted such that its cutting path 300 closely match the profile of this curvature. Accordingly, and because the cutting-edge shape 300 of a cup-shaped tool is an ellipse and the lens curvature 296 is somewhat circular, it is at times difficult to accurately match this prescribed curvature with the profile 300 of a cup-shaped tool. This difficulty is known to generate elliptical errors 'E' in the lens wherein the thickness of the lens along the upper and lower edges exceeds an ideal minimum value.

With the method of the preferred embodiment, the system computer simulates on the virtual entity of the lens blank, or on a prescribed model thereof as explained earlier, a set of proposed tool paths with the cylindrical axis 292 oriented horizontally, and estimates the amount of elliptical error for each proposed tool path. The system computer also simulates a surfacing operation with the cylindrical axis 292 oriented vertically, and calculates again the amount of elliptical error in this case.

Generally, a spherical meridian 298 has a radius that is longer than the radius of a cylindrical meridian 296. Therefore, when the spherical curvature 298 is oriented at right angle with the tool path for example, it is easier to find a tool angle that will closely match this spherical curvature. When the spherical meridian 298 is set upright, the elliptical error along that curvature is thereby reduced by a great extent.

Because the lens generating apparatus of the present invention has a great precision in its movement, and especially along the horizontal plane, it becomes easy to shape the lens along the cylindrical meridian 296 with practically no error when this curvature is aligned horizontally for example. In these cases the quality of a lens along the cylindrical meridian is also improved by a great extent.

The application of the method of the preferred embodiment in combination with a lens generating apparatus that has a rotatable lens chuck 238 allow the generation of an ophthalmic lens with the cylindrical axis thereof oriented horizontally or vertically. When the lens generating apparatus has a fixed chuck, the above calculations and analyses are effected using the prescribed model of the lens, prior to displaying a lens template at the imaging station, such the cylindrical axis of the lens will nonetheless be set at a proper angle to obtain optical surfaces that are virtually free from elliptical error.

Moreover, and because an accurate virtual entity of the lens blank is usable as a standard for monitoring the lens generating process, the back surface of the lens is generated at a selected distance from the front surface. Therefore, the lens generated by this method have reduced elliptical errors, optimized curvatures, and are therefore substantially thinner than those generated by other processes of the prior art.

While the above description provides a full and complete disclosure of the preferred embodiment of the method of this invention, various modifications, alternate steps and equivalents may be employed without departing from the true spirit and scope of the invention. Therefore, the above description and the illustrations should not be construed as limiting the scope of the invention which is defined by the appended claims.

I claim:

1. A method for generating a virtual entity of a lens blank in a computer environment, comprising the steps of:

defining a spatial coordinate system in a computer environment;

analyzing an image of a lens blank and locating said image in said spatial coordinate system;

measuring a back curvature of said lens blank and locating said back curvature in said spatial coordinate system;

probing a front curvature of said lens blank and locating said front curvature in said spatial coordinate system; and integrating said image, said back curvature and said front curvature and generating a virtual entity of said lens blank in said computer environment;

such that said virtual entity is a precise representation of said lens blank and is usable for monitoring a lens surfacing process when said process is adapted to be controlled in said computer environment.

2. A method for blocking an ophthalmic lens blank to a support block, and for generating a virtual entity of said lens blank in a computer environment, said method comprising the steps of:

defining a spatial coordinate system in a computer environment;

analyzing an image of a lens blank and locating said image in said spatial coordinate system;

measuring a back curvature of said lens blank and locating said back curvature in said spatial coordinate system;

probing a front curvature of said lens blank and locating said front curvature in said spatial coordinate system;

generating a virtual entity of said lens blank in said computer environment and locating said virtual entity in said spatial coordinate system;

locating a support block within said spatial coordinate system; and while monitoring a position of said virtual entity relative to said support block, positioning said lens blank above said support block at a distance from said support block, and injecting bonding material between said lens blank and said support block for bonding said lens blank to said support block;

such that irregularities in a curvature of said lens blank facing said support block are inconsequential to a precision of a position of said lens blank relative to said support block.

3. The method as claimed in claim 2, wherein said support block is positioned inside a molding ring, and said step of positioning said lens blank above said support block at a distance from said support block, also comprises the step of positioning said lens blank above said molding ring at a distance from said molding ring.

4. The method as claimed in claim 2, further comprising the step of moving said lens blank from an imaging station to a probing station, and from said probing station to a molding station while precisely monitoring a displacement of said lens blank.

5. The method as claimed in claim 4, wherein said step of bonding said lens blank to said support block is preceded by the step of decentering said lens blank relative to said support block.

6. The method as claimed in claim 2, further comprising the steps of defining a datum plane on said support block and an angular alignment of said support block in said datum plane, relative to said spatial coordinate system, and associating said virtual entity to said datum plane and said angular alignment.

7. The method as claimed in claim 6, wherein said support block has an identification code affixed thereto and said method further comprises the steps of reading said identification code, and associating said virtual entity to said identification code.

8. The method as claimed in claim 2, further comprising the steps of comparing characteristics of said virtual entity to specifications of said lens blank.

9. A method for generating a surface on an ophthalmic lens using lens structure cognition, spatial positioning, and a lens generating apparatus operable in a computer environment, said method comprising the steps of:

defining a spatial coordinate system in a computer environment;

analysing an image of a lens blank and locating said image in said spatial coordinate system;

measuring a back curvature of said lens blank and locating said back curvature in said spatial coordinate system;

probing a front curvature of said lens blank and locating said front curvature in said spatial coordinate system;

generating a virtual entity of said lens blank in said computer environment and locating said virtual entity in said spatial coordinate system;

locating said lens generating apparatus in said spatial coordinate system;

simulating an ideal tool path on said virtual entity, and analysing results of said ideal tool path;

installing said lens blank in said lens generating apparatus and programming said ideal tool path in said lens generating apparatus; and generating a surface on said lens blank using said lens generating apparatus and said ideal tool path;

such that said ideal tool path is devisable before a lens generation operation begins, and such that said lens generation operation is controllable using standards embodied in said virtual entity.

10. The method as claimed in claim 9 wherein said step of simulating an ideal tool path comprises the steps of:

simulating a first and subsequent tool paths on said virtual entity, evaluating optical error on said virtual entity relative to each of said first and subsequent tool paths, and defining one of said first and subsequent tool paths generating minimum optical error; and assigning said one of said first and subsequent tool paths as said ideal tool path.

11. The method as claimed in claim 9 further comprising the following steps before said step of installing a lens blank in said lens generating apparatus:

locating a support block within said spatial coordinate system;

while monitoring a position of said virtual entity relative to said spatial coordinate system, positioning said lens blank above said support block at a distance from said support block, and while holding said lens blank at a distance from said support block, injecting bonding material between said lens blank and said support block for bonding said lens blank to said support block.

12. The method as claimed in claim 11, further comprising the step of:

defining a first datum plane on said support block and a first angular alignment of said support block in said first datum plane, relative to said spatial coordinate system, and associating said virtual entity to said first datum plane and to said first angular alignment.

13. The method as claimed in claim 12, wherein said support block has an identification code affixed thereto and said method further comprises the step of reading said identification code.

14. The method as claimed in claim 13, further comprising the step of associating said virtual entity to said identification code.

15. The method as claimed in claim 12, further comprising the step of:

locating a second datum plane and a second alignment reference in said second datum plane on said lens generating apparatus;

transferring characteristics of said virtual entity from said first datum plane and said first angular alignment to said second datum plane and said second alignment reference; and while generating a surface on said lens blank, monitoring a portion of said virtual entity in said spatial coordinate system.

16. A method for generating a surface on an ophthalmic lens using lens structure cognition, spatial positioning, and a lens generating apparatus operable in a computer environment, said method comprising the steps of:

defining first and second spatial coordinate systems in a computer environment;

analysing an image of a lens blank and locating said image in said first coordinate system;

measuring a back curvature of said lens blank and locating said back curvature in said first spatial coordinate system;

probing a front curvature of said lens blank and locating said front curvature in said first spatial coordinate system;

generating a virtual entity of said lens blank in said computer environment and locating said virtual entity in said first spatial coordinate system;

locating a support block in said first spatial coordinate system;

locating said lens blank relative to said support block;

blocking said lens blank on said support block;

assigning reference to said support block in said first spatial coordinate system, and assigning said virtual entity to said reference;

transferring said reference in said second spatial coordinate system;

simulating an ideal tool path on said virtual entity in said second spatial coordinate system;

evaluating optical error on said virtual entity relative to said ideal tool path;

locating said lens generating apparatus in said second spatial coordinate system;

installing said lens blank in said lens generating apparatus and programming said ideal tool path in said lens generating apparatus; and while monitoring a position of said virtual entity, generating a surface on said lens blank using said lens generating apparatus and said ideal tool path;

such that said virtual entity is producible as a precise representation of said lens blank and said step of generating a surface on said lens blank is doable while precisely monitoring physical characteristics of said lens blank.

17. The method as claimed in claim 16, wherein said step of simulating an ideal tool path comprising the steps of:

simulating a first and subsequent tool paths on said virtual entity, evaluating optical error on said virtual entity related to each of said first and subsequent tool paths, and defining one of said first and subsequent tool paths generating minimum optical error; and assigning said one of said first and subsequent tool paths as said ideal tool path.

18. The method as claimed in claim 17, wherein said step of generating a surface on said lens blank includes the step of generating a surface having spherical power, cylindrical power, and cylindrical axis, and said step of simulating a first and subsequent tool paths on said virtual entity comprises the step of rotating said virtual entity between each said tool path.

19. The method as claimed in claim 18, wherein said step of evaluating optical error on said virtual entity includes the step of evaluating elliptical error in a direction perpendicular to each said tool path.

20. The method as claimed in claim 17, wherein said step of generating a surface on said lens blank comprises the step of generating a far vision region, a progressively varying intermediate vision region and a near vision region.

* * * * *